US006963846B1

(12) United States Patent
Kelly et al.

(10) Patent No.: US 6,963,846 B1

(45) Date of Patent: Nov. 8, 2005

(54) SYSTEM AND METHOD OF MANAGING REGISTRATION, SALE, DISTRIBUTION AND USE OF REGULATED AGRICULTURAL PRODUCTS AND THE LICENSING/CERTIFICATION OF DEALERS AND APPLICATORS OF AGRICULTURAL PRODUCTS

(75) Inventors: J. Keith Kelly, Newborn, GA (US); Peter S. Edmondson, Alpharetta, GA (US)

(73) Assignee: Kelly Registration Systems, Inc., Covington, GA (US)

(*) Notice: Subject to any disclaimer, the term of this patent is extended or adjusted under 35 U.S.C. 154(b) by 788 days.

(21) Appl. No.: 09/760,890

(22) Filed: Jan. 17, 2001

Related U.S. Application Data

(60) Provisional application No. 60/218,684, filed on Jul. 17, 2000.

(51) Int. Cl.[7] .......... G06F 17/60

(52) U.S. Cl. .......... 705/1; 705/55; 705/56; 705/57; 705/51; 705/500; 713/194; 713/68; 713/201; 713/200; 713/171; 713/150

(58) Field of Search .......... 705/1, 51, 55, 705/56, 57, 500; 235/375; 434/350; 713/150, 171, 182, 194, 200, 201

(56) References Cited

U.S. PATENT DOCUMENTS 4,394,567 A 7/1983 Schönhuber .......... 235/375

5,023,907 A * 6/1991 Johnson et al. .......... 705/26

(Continued)

OTHER PUBLICATIONS

Iowa Department of Agriculture and land stewardship Awards Contract for E–Government Services—Business and Public will benefit from Online information and services, Tom Johnson, KRSNetwork, Jan. 15, 2003, www.KRSNetwork.com.*

New Online License Renewal Program Available To Georgia's Pest Control Industry—Internet site to provide program in addition to other useful online tools, Tom Johnson, KRSNetwork, Jan. 15, 2003, www.KRSNetwork.com.*

*Primary Examiner*—James P. Trammell
*Assistant Examiner*—C Owen Sherr
(74) *Attorney, Agent, or Firm*—McKenna Long & Aldridge LLP

(57) ABSTRACT

A method and system for managing agricultural product information, and for facilitating the controlled sale, distribution, and use of agricultural products provides a single data entry process for submitting agricultural product registration applications and renewals for a plurality of jurisdictions (states). A single username and password can be used to access a plurality of state databases. State data can be easily cross-referenced and indexed against federal product registration data. Also provided is a system and process of field inspection and enforcement of registration requirements for agricultural products, wherein universal product codes (UPCs) may be scanned into a portable data terminal and be used to check the approval status of a product found in a retailer's store.

31 Claims, 28 Drawing Sheets

U.S. PATENT DOCUMENTS

| | | | | | |
|---|---|---|---|---|---|
| 5,204,813 | A | * | 4/1993 | Samph et al. | 434/362 |
| 5,206,818 | A | | 4/1993 | Speranza | 364/550 |
| 5,310,349 | A | | 5/1994 | Daniels et al. | 434/350 |
| 5,479,359 | A | | 12/1995 | Rogero et al. | 364/496 |
| 5,497,314 | A | | 3/1996 | Novak | 364/403 |
| 5,506,783 | A | | 4/1996 | Tanaka et al. | 364/468 |
| 5,579,479 | A | | 11/1996 | Plum | 395/188.01 |
| 5,638,285 | A | | 6/1997 | Newton | 364/479.11 |
| 5,664,112 | A | * | 9/1997 | Sturgeon et al. | 705/28 |
| 5,790,664 | A | | 8/1998 | Coley et al. | 380/4 |
| 5,790,785 | A | | 8/1998 | Klug et al. | 395/188.01 |
| 5,825,893 | A | | 10/1998 | Kara | 380/51 |
| 5,905,860 | A | | 5/1999 | Olsen et al. | 395/187.01 |
| 5,935,243 | A | | 8/1999 | Hasebe et al. | 713/200 |
| 5,940,504 | A | | 8/1999 | Griswold | 380/4 |
| 5,950,173 | A | | 9/1999 | Perkowski | 705/26 |
| 5,974,446 | A | | 10/1999 | Sonnenreich et al. | 709/204 |
| 6,002,915 | A | | 12/1999 | Shimizu | 434/350 |
| 6,009,401 | A | | 12/1999 | Horstmann | 705/1 |
| 6,064,979 | A | * | 5/2000 | Perkowski | 705/26 |
| 6,097,995 | A | | 8/2000 | Tipton et al. | 700/266 |
| 6,151,707 | A | | 11/2000 | Hecksel et al. | 717/11 |
| 6,154,738 | A | | 11/2000 | Call | 707/4 |
| 6,169,976 | B1 | | 1/2001 | Colosso | 705/59 |
| 6,256,640 | B1 | | 7/2001 | Smalley et al. | 707/104 |
| 6,269,344 | B1 | | 7/2001 | Junger | 705/28 |
| 6,285,916 | B1 | | 9/2001 | Kadaba et al. | 700/222 |
| 6,289,254 | B1 | | 9/2001 | Shimizu et al. | 700/96 |
| 6,289,452 | B1 | | 9/2001 | Arnold et al. | 713/175 |
| 6,302,698 | B1 | | 10/2001 | Ziv-El | 434/323 |
| 6,327,707 | B1 | | 12/2001 | McKeeth et al. | 717/11 |
| 6,389,538 | B1 | * | 5/2002 | Gruse et al. | 713/194 |
| 6,546,230 | B1 | * | 4/2003 | Allison | 434/350 |
| 2002/0042762 | A1 | * | 4/2002 | McQuade et al. | |

* cited by examiner

APPLICATOR/DEALER DATA

MISCELLANEOUS TABLES

SYSTEM AND METHOD OF MANAGING REGISTRATION, SALE, DISTRIBUTION AND USE OF REGULATED AGRICULTURAL PRODUCTS AND THE LICENSING/CERTIFICATION OF DEALERS AND APPLICATORS OF AGRICULTURAL PRODUCTS

CROSS REFERENCES TO RELATED APPLICATIONS

This application claims the priority of U.S. Provisional Patent Application No. 60/218,684, filed on Jul. 17, 2000 and entitled "SYSTEM AND METHOD OF CONTROLLING REGULATED PESTICIDE AND FERTILIZER PRODUCTS," U.S. patent application Ser. No. 09/603,737, filed on Jun. 23, 2000, and entitled "METHOD AND SYSTEM OF TRACKING AND REPORTING PESTICIDE SALES," and U.S. patent application Ser. No. 09/662,492, filed on Sep. 15, 2000, and entitled "SYSTEM AND METHOD OF PROVIDING AGRICULTURAL PESTICIDE INFORMATION AND FACILITATING SALES OF PESTICIDE PRODUCTS," the entirety of each of which is hereby incorporated by reference for all purposes as if fully set forth herein.

BACKGROUND OF THE INVENTION

1) Field of the Invention

The present invention relates generally to the field of agriculture and more particularly to a method and system for managing agricultural information, and for facilitating the controlled sale, distribution, and use of agricultural products, including pesticides and fertilizers.

2) Description of the Related Art

The U.S. Department of Agriculture regulates agricultural products, weights and measures, and dealers and applicators of agricultural products. As used herein, the term "agricultural products" is understood to refer generally to pesticide products and fertilizers, feeds (e.g., dog food, cattle feed, etc.), seeds, dairy products, and crops, including specifically but without limitation, regulated pesticide and fertilizer products.

Though often misunderstood to refer only to insecticides, the term "pesticide" also applies to herbicides, fungicides, and various other substances used to control pests. As broadly used herein, pests include insects, mice and other animals, unwanted plants (weeds), fungi, or microorganisms like bacteria and viruses. Pesticides are useful to society because of their ability to kill potential disease-causing organisms, control insects, weeds, and other pests. At the same time, by their very nature, most pesticides create some risk of harm to humans, animals, or the environment because they are designed to kill or adversely affect living organisms.

Accordingly, in many countries, the sale and/or use of agricultural products is regulated by various government agencies.

Within the United States, the Environmental Protection Agency (EPA) provides a federal or national level of regulation of pesticide products. The EPA defines a pesticide as any substance or mixture of substances intended for preventing, destroying, repelling or mitigating any pest. Under United States law, a pesticide is also any substance or mixture of substances intended for use as a plant regulator, defoliant, or desiccant. Drugs used to control diseases of humans or animals (such as livestock and pets) are not legally considered pesticides. Fertilizers, nutrients, and other substances used to promote plant survival and health are not considered plant growth regulators and thus are not pesticides.

The EPA regulates pesticides by developing and implementing policies which require testing to assess pesticide safety, as well as requiring registration and proper labeling of pesticides. The EPA further maintains a database of federally registered pesticide products and assigns an EPA identification code (EPA ID) to each federally registered pesticide product. For each federally registered pesticide product, the EPA database includes the EPA ID, pesticide type (e.g., herbicide, fungicide, insecticide, disinfectant, etc.), and a list of active ingredients in the pesticide product.

Also, for certain restricted use pesticide (RUP) products, the federal government requires each state to license all dealers and applicators. RUP products may not be legally sold to or used by individuals who are not licensed or certified. Similarly, RUP products may only be sold within a state by a dealer which has been licensed in the state. Generally, these RUP products include pesticides intended for widespread agricultural or industrial use and which may, if used improperly, present a serious threat to public health and/or the environment.

The states, on a state-by-state basis, provide a second level of regulation of pesticides by requiring approval for the sales and use of pesticides. Different states have their own procedures for approval and registration of pesticide products. Also, various states require all dealers and applicators to be licensed for certain state restricted use pesticide (S-RUP) products and state limited use products (SLUP). SLUP includes products which may be legally purchased & used in small quantities (e.g., 16 oz or less) but which require a license to be purchased and used in large quantities. There are also special local need (SLN) products which are pesticides intended to address a specific crop or problem in a specific area and which may, if used improperly, present a serious threat to public health and/or the environment. S-RUP and SLN products may not be legally sold to or used by unlicenced individuals within these states.

This invention is directed toward improved methods and systems of managing agricultural product information, and for facilitating the controlled sale, distribution, and use of agricultural products, including pesticide products. The systems and methods disclosed herein are especially useful for governmental entities (e.g., states) and their designated agencies to administer the registration and renewals of approved agricultural products, the licensing of dealers and applicators, the tracking and reporting of pesticide usage, field inspection and enforcement of agricultural product control laws, facilitating the sale of restricted use pesticide (RUP) products, reporting and disseminating information to interested parties, and tax collection (e.g., feeds, fertilizer, seeds, etc.).

SUMMARY OF THE INVENTION

It is an object of the present invention to provide a method and system for managing agricultural product information, and for facilitating the controlled sale, distribution, and use of agricultural products.

Other objects and advantages will become apparent to those skilled in the art from a review of the ensuing description which proceeds with reference to the following illustrative drawings.

DESCRIPTION OF THE PREFERRED EMBODIMENTS

As used herein, the term "plant" is understood to broadly describe a variety of forms of plant life, including plants, trees, shrubs, grasses, vines, flowers, and the like.

The term "pest(s)" as used herein is understood to include insects, mice and other animals, unwanted plants (weeds), fungi, or microorganisms like bacteria and viruses. A "pesticide" is understood to include insecticides, herbicides, fungicides, and other substances used to control pests. "Agricultural products" are understood to include pesticides, fertilizers, feeds (e.g., dog food, cattle feed, etc.), seeds, dairy products, and crops, including specifically but without limitation, regulated pesticide and fertilizer products.

The present invention will be discussed with reference to preferred embodiments in the form of a computer program. Numerous specific details, such as specific user queries, the order of the queries, etc. are set forth in order to provide a thorough understanding of the present invention. The preferred embodiments described herein are for the purposes of illustration only and should not be understood to limit the invention.

The embodiment(s) will be discussed with reference to flowcharts. The flowcharts make numerous mentions of querying a user for information. This act may be performed in a number of different ways. For example, in a preferred embodiment, the methods and systems described herein are practiced via an Internet site. In such an embodiment, the act of querying is performed by presenting a user with a number of choices that the user may "click" on to indicate a response. Such choices may be presented textually, such as by providing a number of hypertext links that move the user to a different portion of a hypertext document or different documents; or graphically. Many other embodiments are also contemplated.

Also, the preferred embodiments are discussed with respect to the operations of a state government agency in the United States. In other countries, the methods and systems described herein for managing agricultural product information, and for facilitating the controlled sale, distribution, and use of agricultural products may be operated by different governmental bodies (provinces; municipalities; etc.) and government agencies, as the laws in those areas dictate. Accordingly, the broad applicability and scope of the invention should not be limited to the existing governmental regulatory framework in the United States.

Figure 1:
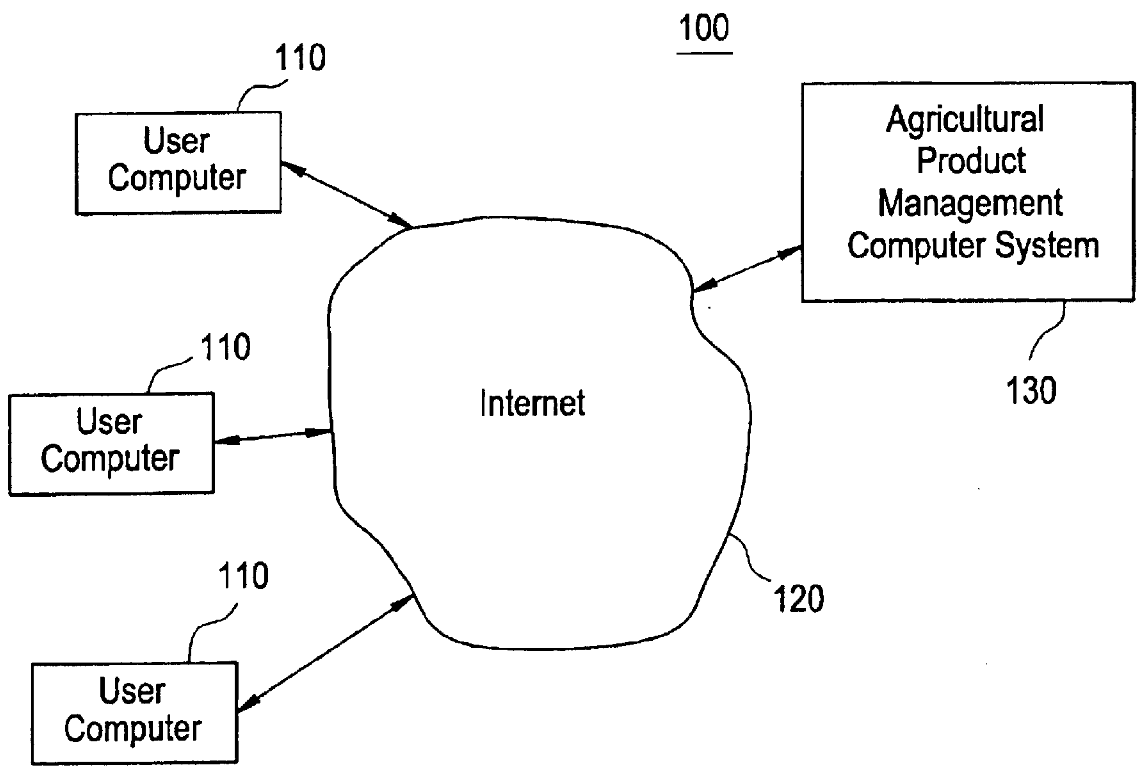
FIG. 1 is a block diagram of a computer network for illustrating one or more aspects of the present invention.

A preferred embodiment of a computer network 100 which may be used to manage agricultural product information, and for facilitating the controlled sale, distribution, and use of agricultural products according to one or more aspects of the present invention is shown in FIG. 1. The computer network 100 includes a plurality of user computers 110 connected by the Internet 120 with an agricultural product management computer system 130.

A user computer 110 preferably includes a central processing unit (CPU), memory, a communication device such as a modem, and data input/output device(s), such as a display monitor, a keyboard/keypad, a mouse, a speaker, etc. The user computer 110 may operate and be connected in a separate computer network, such as a corporate intranet. The user computer 110 may be a standalone multipurpose computer, such as a MACINTOSH™ or WINDOWS™ based personal computer (PC), but it may take a variety of other forms as well. For example, the user computer 110 may be an Internet appliance, a television-based Internet access system, a cellular telephone, a personal digital assistant, or any other suitable intelligent peripheral which may allow a user to access information via a computer network.

Figure 2A:
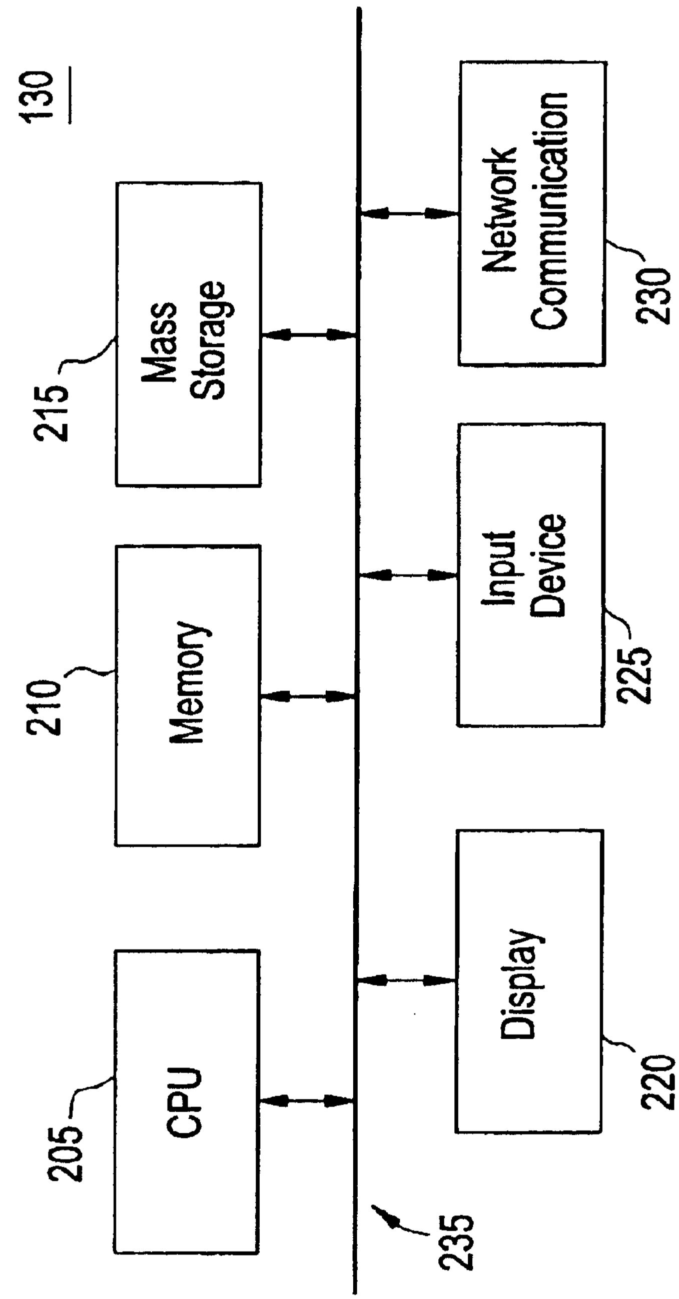
FIG. 2A is a block diagram of an agricultural product management computer system.

FIG. 2A is a block diagram of an agricultural product management computer system 130. In a preferred embodiment, the agricultural product management computer system 130 includes at least one CPU 205 having associated therewith memory 210 and a mass data storage device 215, and optionally a display device 220, a data input device 225 (e.g., keyboard; mouse), and a network connection device 230, all connected to each other via a communication bus 235. The data storage device 215 includes nonvolatile data storage means, such magnetic disk drive units, optical disk drive units, removable disk drive units, tape media, or any combination thereof. The network connection device 230 includes hardware and software for establishing a data link connection between the agricultural product management computer system 130 and user computer 110 via the Internet 120. Preferably, the interconnection circuitry 120 is the Internet and the network connection device 230 includes circuitry to tie directly to the Internet via T1, T4 or similar high bandwidth data lines as would be understood by one skilled in the art.

The agricultural product management computer system 130 may include two or more integrated computer units, each having a separate CPU 205 having associated therewith memory 210 and/or a mass data storage device 215, and optionally a display device 220 and a data input device (e.g., keyboard; mouse) 225. The communication bus 235 may include two or more internal buses for integrated computer units, together with an external bus connecting two or more integrated computer units.

Figure 2B:
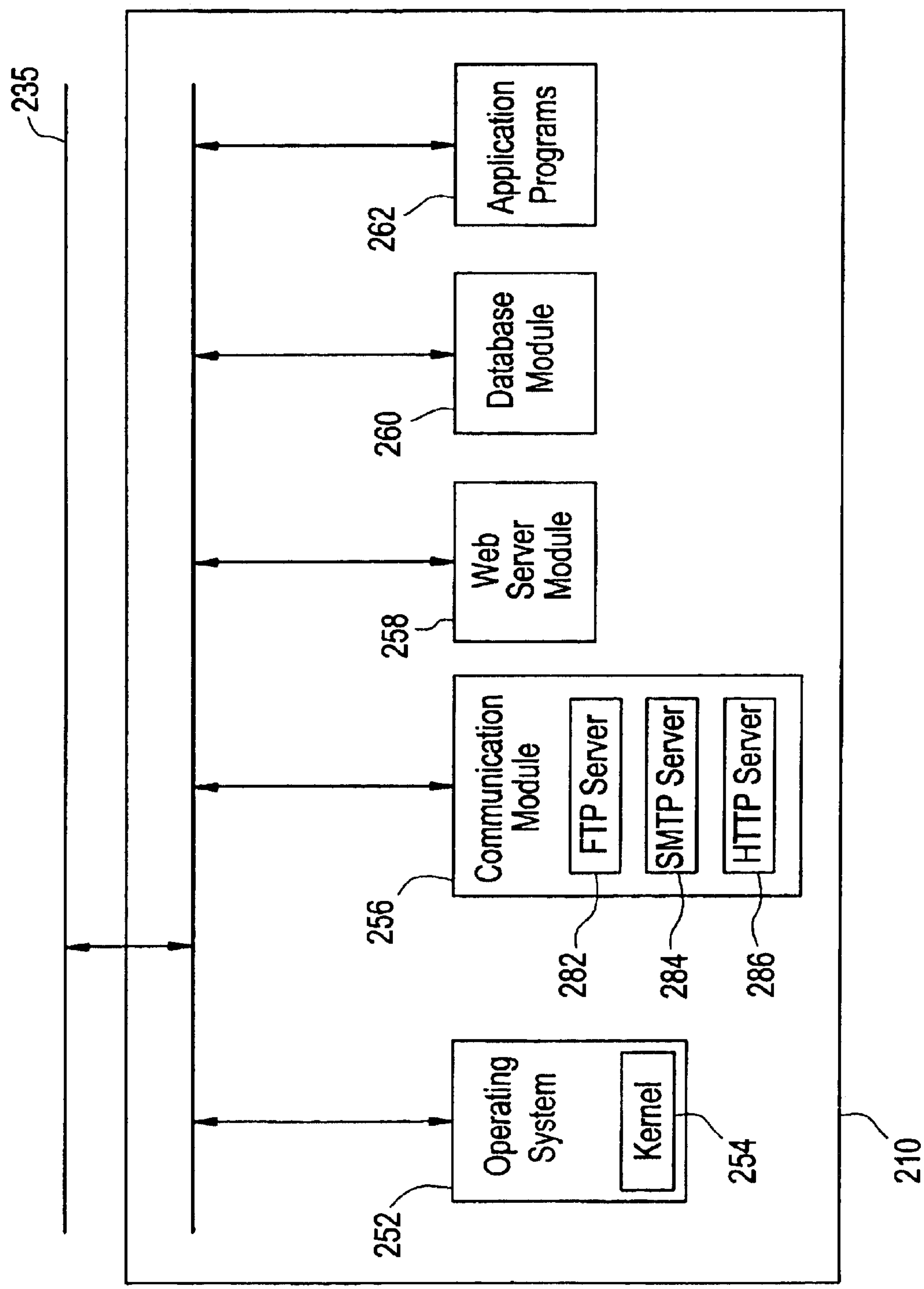
FIG. 2B is a block diagram illustrating a preferred embodiment of the memory associated with a CPU of the agricultural product management computer system.

FIG. 2B is a block diagram illustrating a preferred embodiment of the memory 210 associated with a CPU 205 of the agricultural product management computer system 130. The memory 210 includes modules of a software application for hosting an agricultural product management Web site. The software application and its modules may also be stored on another computer readable medium associated with the agricultural product management computer system 130, such as compact disc read-only memory (CD-ROM) devices, tapes, or similar non-volatile devices.

The memory 210 is in communication with the communication bus 235, and preferably comprises an operating system 252, including a kernel 254, a communication module 256, a Web server module 258, a database administration module 260, and any desired application programs 262. The memory 210 is preferably a random access memory, but may also include read-only memory.

The operating system 252 preferably is WINDOWS NT®, but may be UNIX, DOS, MACINTOSH® Operating System, LINUX, SOLARIS®, or any other suitable operating system. The memory 210 also may include a variety of different application programs 272, including for example, word processing programs, spreadsheet programs, database programs, etc.

The communication module 256 facilitates communications between the agricultural product management computer system 130 and one or more user computers 110 via network connection device 230 and the Internet 120. In that case, the communication module 266 preferably includes a File Transfer Protocol (FTP) proxy server 282, a Simple Mail Transfer Protocol (SMTP) proxy server 284, and a Hyper Text Transfer Protocol (HTTP) proxy server 286.

The Web server module 258 may host a plurality of Web pages and provide these Web pages to a Web browser resident on a user computer 110 via the HTTP proxy server 286.

The database administration module 260 preferably manages databases such as a pest database, a plant database, a pesticide product database, a fertilizer product database, a seed product database, a dealer database, an applicator database, an ingredients database, etc. at the agricultural product management Web site. The database may be SQL, Oracle, Access, or other convenient format. The databases may be stored in the mass data storage device 215 and/or the memory 210.

Figure 3A:
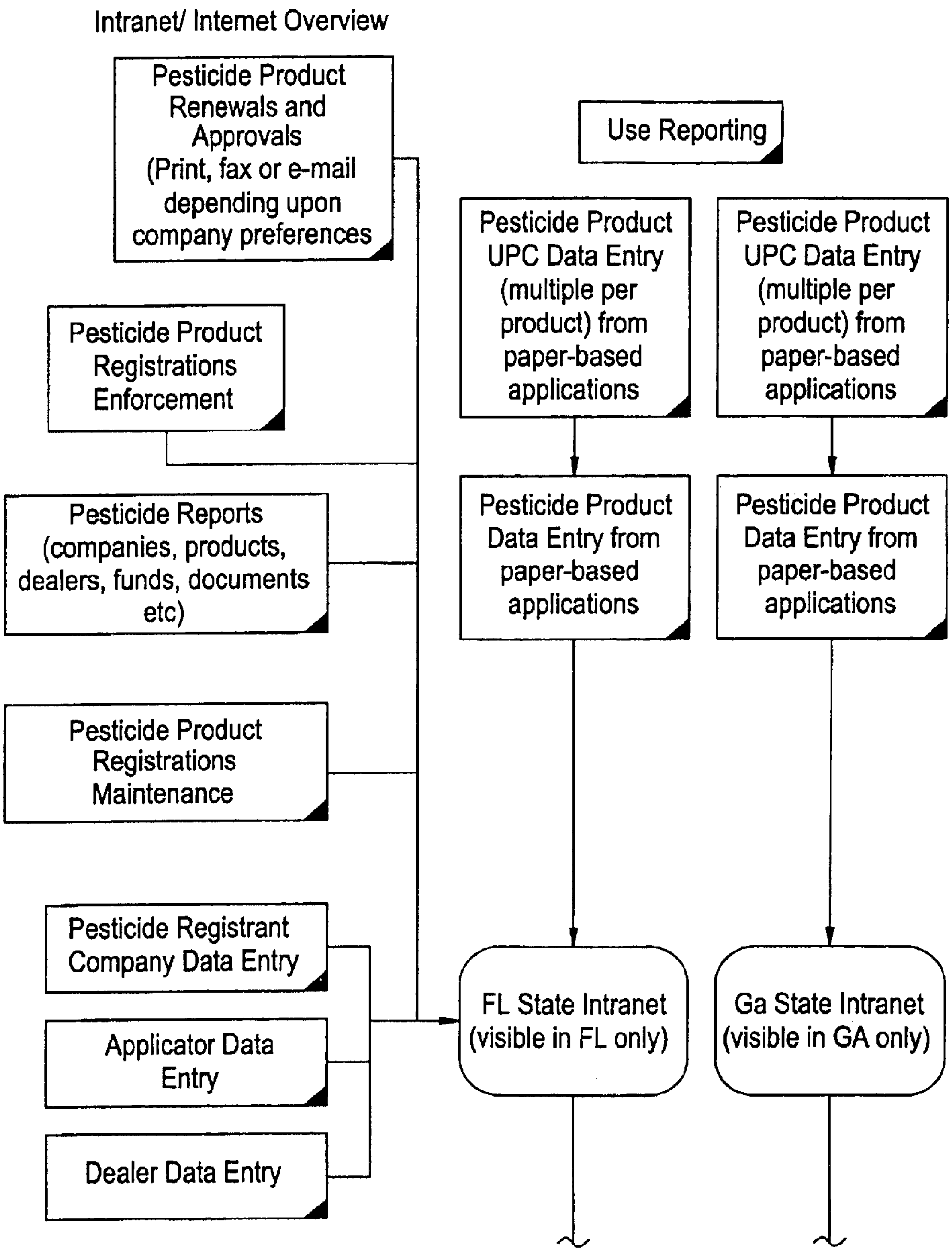
FIG. 3 is a top level diagram illustrating interrelationships between various components of a system managing agricultural product information, and for facilitating the controlled sale, distribution, and use of agricultural products.
Figure 3B:
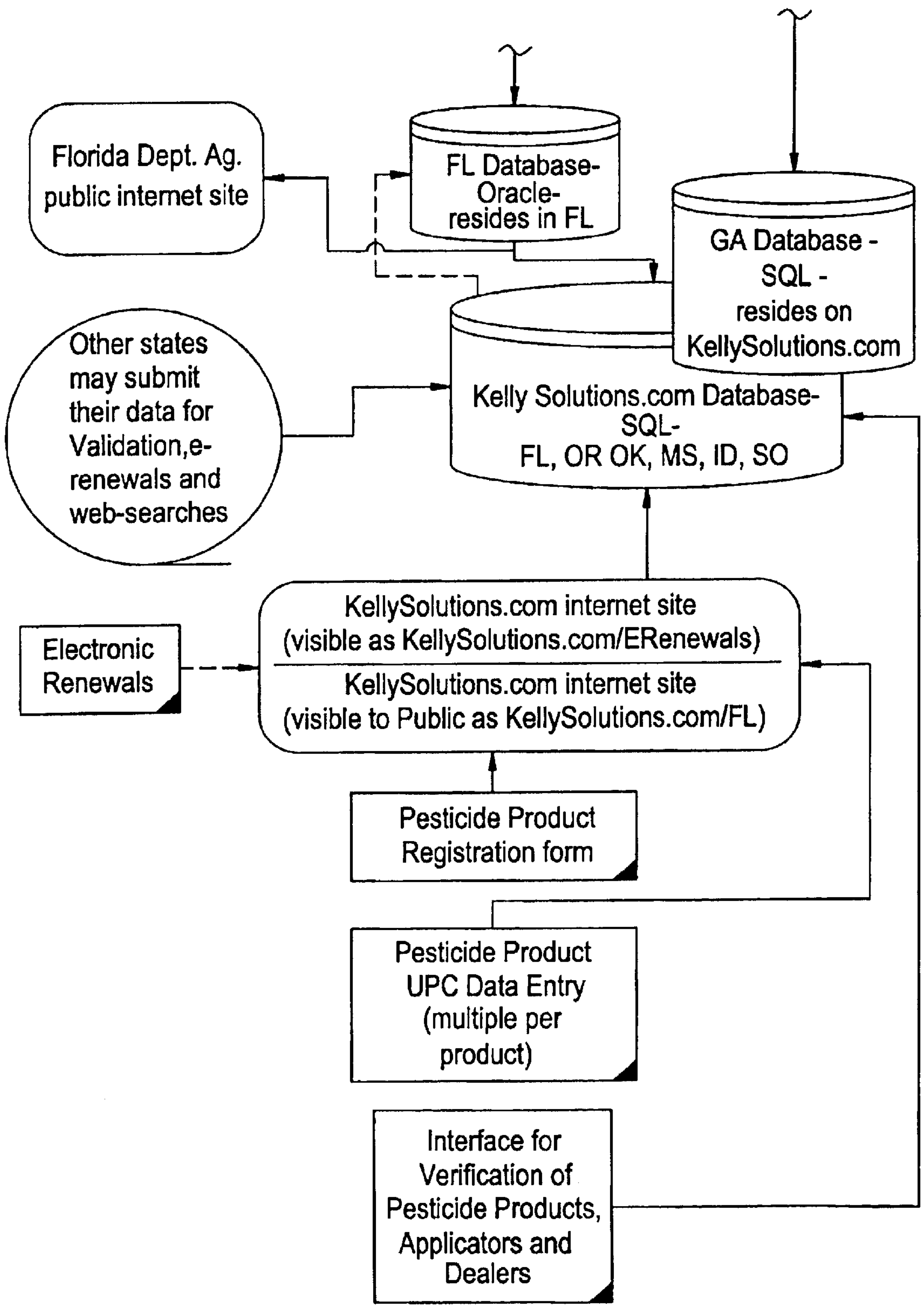

FIG. 3 illustrates interrelationships between various components of a system for managing agricultural product information, and for facilitating the controlled sale, distribution, and use of agricultural products. FIG. 3 illustrates that an agricultural product management computer system preferably includes both intranet and extranet components.

As shown in FIG. 3, actual initial pesticide product approvals, registration enforcement, licensing, and use reporting may preferably be accomplished via an intranet component of the agricultural product management computer system. Access to such an intranet portion may be limited to authorized employees or agents of the state government. Preferably, the intranet components are only accessible over a private computer network and are well isolated from extranet components so that hackers may not obtained unauthorized access to these intranet components.

Meanwhile, license renewals, product registration renewals, and validation of licensing information in support of on-line (e.g., Internet) sales of pesticide products, and other functions may preferably be accomplished via an extranet component of the agricultural product management computer system. In the preferred embodiment, these functions and associated software components may be accessible via the Internet.

Figure 4A:
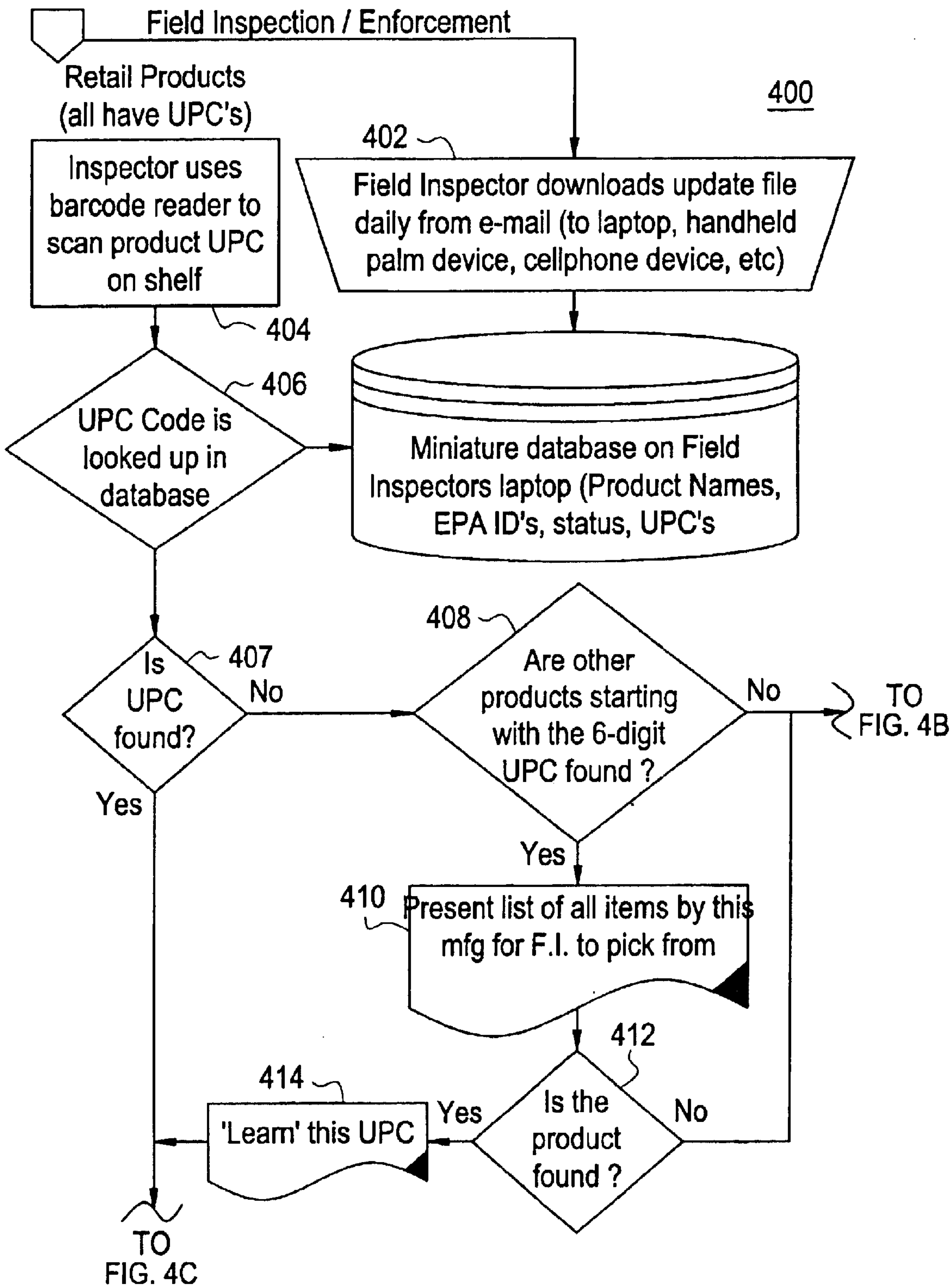
FIG. 4 is a flowchart of a preferred embodiment process of field inspection and enforcement of registration requirements for agricultural products.
Figure 4B:
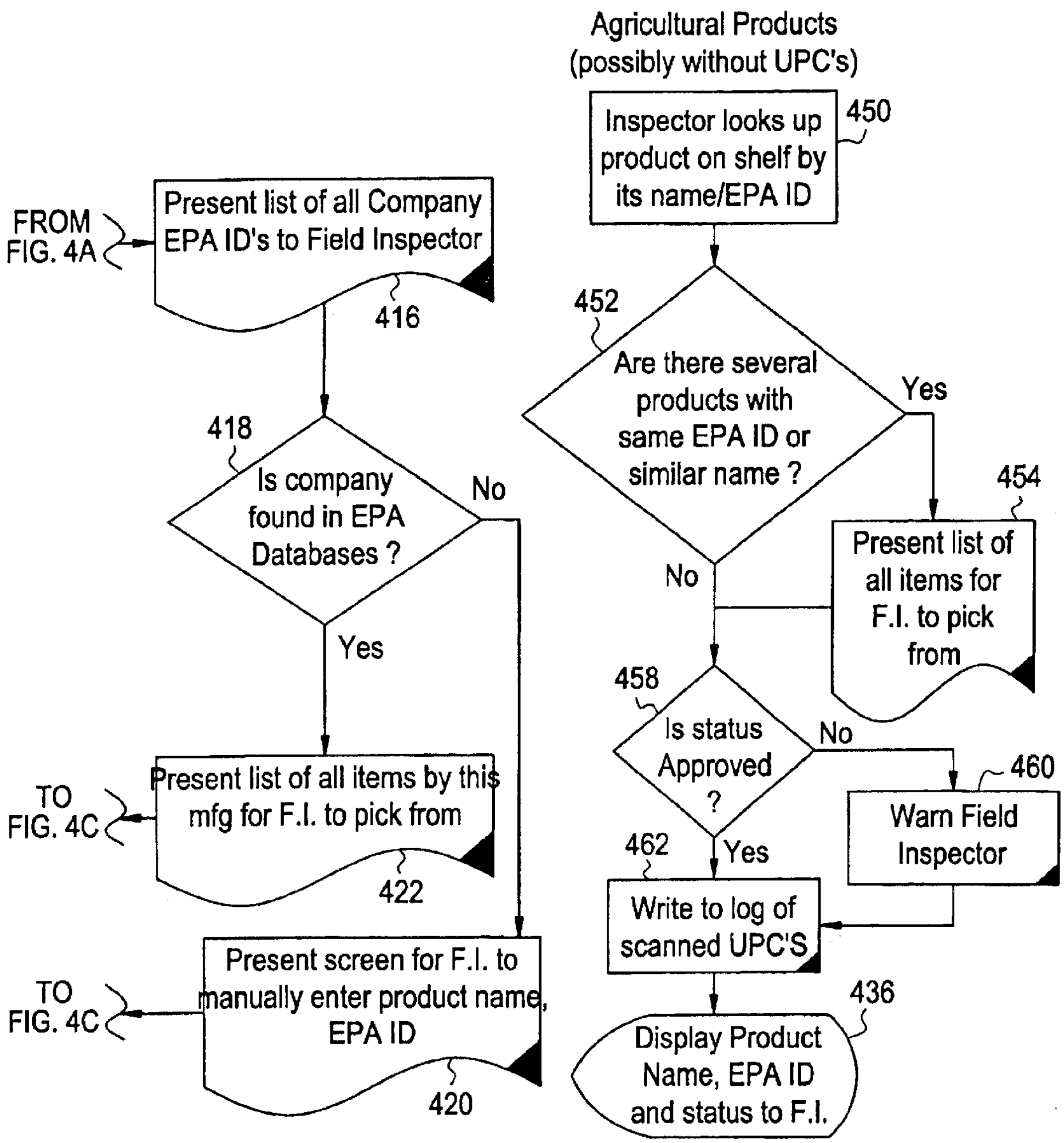
Figure 4C:
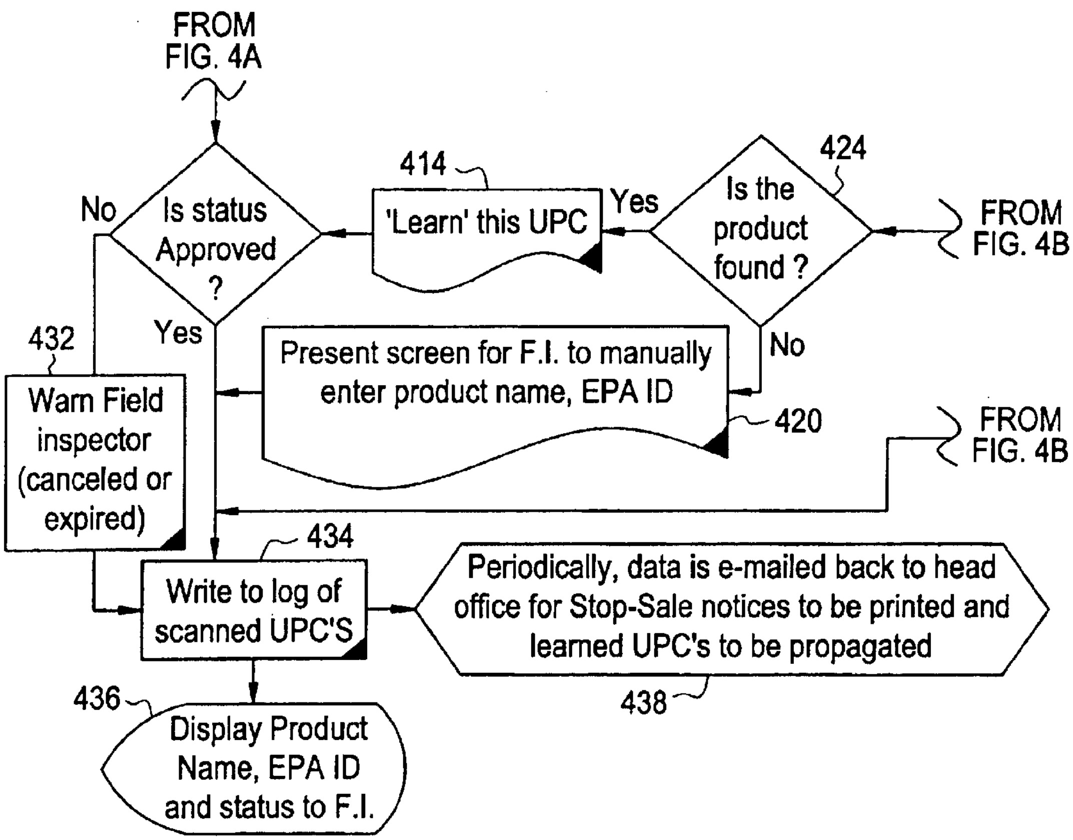

FIG. 4 is a flowchart of a preferred embodiment process 400 of field inspection and enforcement of registration requirements for agricultural products. According to one feature, government (e.g., state) field inspectors may update a master agricultural products database by scanning universal product code (UPC) bar codes on the packages of pesticide products he/she finds on retailer shelves during field inspections. The process includes safeguards to prevent erroneous data entries and includes a self-learning update process, as described below.

In the preferred embodiment process 400, UPCs for agricultural products are "learned" and a master agricultural products database stored at the agricultural products management computer system 130 is automatically updated to include new agricultural product information obtained during field inspections.

In a first step 402, a field inspector downloads product and UPC data stored in databases to a portable data terminal or data processing device, such as a laptop computer, personal digital assistant, palmtop device, or similar device having a processor, memory and data input/output device(s) (e.g, keypad, keyboard, display, etc.). Preferably, there are separate linked databases for products and UPCs—an agricultural products portable database and a product UPC portable database. The agricultural products portable database comprises data records for agricultural products, including registered and approved agricultural products, pending agricultural products, cancelled agricultural products, etc. In a preferred embodiment, the agricultural products portable database includes several data fields for each data record, including an ID field, a Product Name field, an EPA ID field, product status field and an expiration date field. The agricultural products portable database is linked to the product UPC portable database with each entry having an ID field, a UPC field, and a size field. Hereafter the linked agricultural products portable database and product UPC portable database are jointly referred to as the portable database.

The portable database may be downloaded to the portable data terminal from the agricultural products management computer system 130. In a preferred embodiment, the agricultural products management computer system 130 includes a master agricultural products database which may be the product UPC (PRODUPC) database 1330 shown in FIG. 13A. The portable database may be downloaded by e-mail, by direct computer network connection, by wireless data link, or by other suitable means. Preferably, periodically (e.g., daily) the field inspector downloads either a completely new (updated)portable database, or a supplement of additional records from the product UPC (PRODUPC) database 1330.

In a step 404, the field inspector uses an optical bar code reader to scan a UPC bar code of an agricultural product on a store shelf. The bar code reader is connected with the portable data terminal and communicates the bar code UPC to the portable data device for further processing by the processor in the portable data terminal.

In a step 406, the bar code UPC is looked-up in the portable database. If the UPC is found in the portable database, then the corresponding product is determined to be an approved product and the process continues at the step 430 below.

If the bar code UPC is not found in the portable database, then it is still possible that the agricultural product already exists in the portable database, but the database record does not include a UPC in the UPC field. Therefore, in a step 408, the first six (6) digits of the bar code UPC are checked to determine whether they match the first six (6) digits of any of the UPCs stored in the product UPC database. The first six digits of a UPC correspond to a manufacturer code. Accordingly, if there is a match for the first six digits with a product in the portable database, then the manufacturer can be determined. The manufacturer may be used to locate the agricultural product corresponding to the bar code UPC in the portable database, if it exists there.

If there is no match for the first six (6) digits of the bar code UPC, then the process continues at the step 416, described below.

If there is a match for the first six (6) digits of the bar code UPC, then the database record or records containing the match are accessed to identify a corresponding manufacturer for the product. Then, the portable database is accessed to determine all agricultural products listed for the identified manufacturer.

Then, in a step 410, the portable data processing device presents to the field inspector a list of all agricultural products from the identified manufacturer which are included in the portable database. The list may be displayed on an LCD display screen or other suitable data output device. Preferably, for each agricultural product, the list may include a product name, EPA ID, and/or other suitable identifying data.

Next, in a step 412, the field inspector reads the list and compares the listed agricultural products with the agricultural product on the store shelf whose package has been scanned.

If there is a match, then the field inspector indicates which particular agricultural product in the list matches the scanned bar code UPC. This may be done by clicking a mouse button next to the correct agricultural product listing, by highlighting the correct agricultural product listing and typing "enter," or by other well-known means.

In that case, in a step 414, the portable database is updated to add the scanned bar code UPC into the UPC field for the selected product.

Then, the process continues at the step 430 as described below.

If there is no match for the scanned product among the list of all agricultural products from the identified manufacturer in the portable database, then, in a step 416, the portable data terminal presents to the field inspector a list of Company EPA IDs. This list is built from searching through the Company EPA ID fields of each data record in the portable database.

Next, in a step 418, the field inspector reads the list and compares the listed Company EPA IDs with a Company EPA ID which is printed on the package of the scanned agricultural product which the field inspector is checking.

If there is no match for the Company EPA ID in the database, then in a step 420 the field inspector manually enters data for the scanned product into the portable database. Preferably, the portable data terminal presents to the field inspector a data entry form on a display screen whereby the field inspector may manually enter product data, including a product name, an EPA ID, and/or other suitable identifying data. In that case, the field inspector enters the product name, the Company EPA ID, the EPA ID, the product size, and other appropriate data for the scanned product. At that time, the UPC is automatically added and a flag is also set for the new data record in the portable database, indicating that the corresponding data item is a completely new record in the database. That insures that a follow-up check is later performed to determine whether the product is approved for sale in the state or not, so that a "Stop-Sale" notice may be later sent to the retailer and/or the manufacturer if the product is determined to be unapproved.

Then the process continues in the step 434 as described below.

If there is a match for the Company EPA ID in the database, then the field inspector indicates which particular Company EPA ID matches the scanned product. This may be done by clicking a mouse button next to the correct agricultural product listing, by highlighting the correct agricultural product listing and typing "enter," or by other well-known means.

In that case, in a step 422, the portable data unit presents to the field inspector a list of agricultural products from the company having the selected Company EPA ID. This list is built from searching through all data records in the portable database to identify all data records having the selected Company EPA ID in the Company EPA ID field. The list may be displayed on an LCD display screen or other suitable data output device. Preferably, for each agricultural product, the list may include a product name, EPA ID, and/or other suitable identifying data.

Next, in a step 424, the field inspector reads the list and compares the listed agricultural products with the agricultural product on the store shelf whose package has been scanned.

If there is no match for the scanned product among the list of all agricultural products from the identified manufacturer in the portable database, then, in the step 420, the field inspector manually creates a new data record for the selected product, as described before.

If there is a match for the scanned product, then the field inspector indicates which particular agricultural product in the list matches the scanned bar code UPC. This may be done by clicking a mouse button next to the correct agricultural product listing, by highlighting the correct agricultural product listing and typing "enter," or by other well-known means.

In that case, in the step 414, the portable database is updated to add the scanned bar code UPC into the UPC field for the selected product.

Then, in a step 430, the data record for the scanned product is checked to determine whether or not the product is currently approved for sale within the state. The status may be determined by checking whether a flag is entered into a product status, or "Active," field for the data record in the portable database.

If the product is determined not to be approved (i.e., canceled, expired, or pending), then in a step 432, a warning is displayed to the field inspector, indicating that the product is expired or canceled.

Next, in a step 434, the UPC of the scanned product is written to a log of scanned products.

Then, in a step 436, the portable data terminal displays the product name, EPA ID, and product status to the field inspector.

At this point, the field inspector may check another product in which case the process returns to the step 404.

In the case of some bulk agricultural products, there may not be a package with a UPC printed thereon. In that case, in a step 450, the field inspector searches data records in the portable database for any matches to the product name or EPA ID.

In a step 452, the portable data terminal determines whether there are multiple data records for different products matching the product name or EPA ID submitted for search by the field inspector in the step 450. If not, then the process continues at the step 458 below.

If there are multiple data records for different products matching the product name or EPA ID submitted for search by the field inspector in the step 450, then in a step 454, the portable data unit presents to the field inspector a list of agricultural products matching the product name or EPA ID. The field inspector then selects the correct product from the list.

Next, in the step 458, the portable data unit checks a status field in the data record for the product to determine whether it is currently "Approved." If not, then in a step 460, a warning is displayed to the field inspector, indicating that the product is expired or canceled.

Next, in a step 462, the UPC of the scanned product is written to a log of scanned products.

Periodically, after the field inspector has scanned products for one or more stores, in a step 438, the field inspector communicates the log of scanned UPC products to the agricultural products management computer system 130. During this process, the new UPCs which have been learned by the process and added to the portable database are communicated to the master agricultural products database, so that the UPCs for agricultural products are "learned" and the master agricultural products database is automatically updated.

The log may be communicated via the Internet by e-mail, or by connecting to a server of the agricultural products management computer system 130 through a standard network connection.

The agricultural products management computer system 130 executes a software routine to automatically update the master agricultural products database with new UPC information provided by field inspectors.

The process includes safeguards to prevent erroneous data entries to the master agricultural products database. Preferably, when a new UPC is communicated to the agricultural products management computer system 130, a flag is set to identify the new UPC. The new UPC is not confirmed until it is communicated again a second time during a subsequent update of the database.

Figure 5:
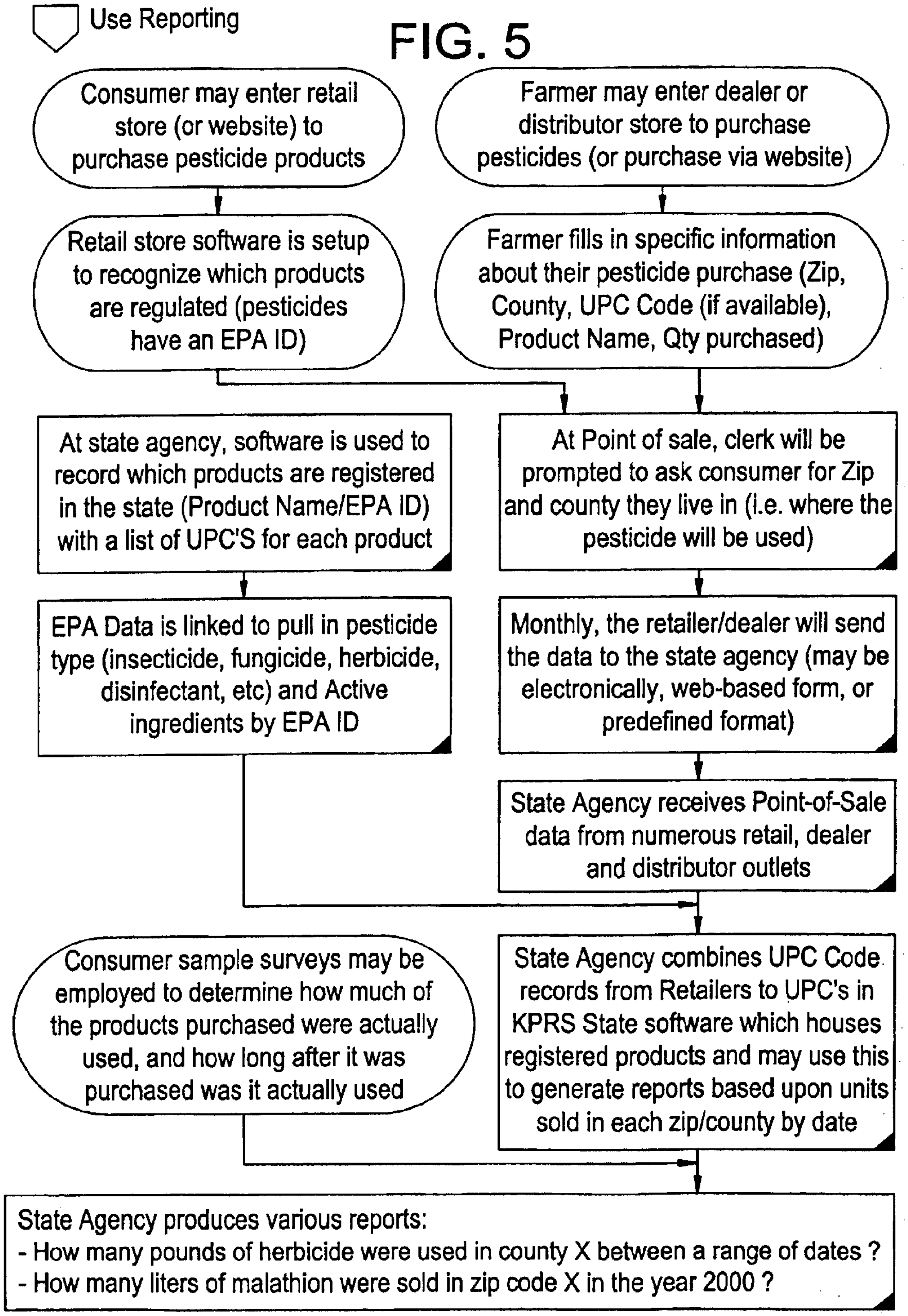
FIG. 5 is a flowchart of a preferred embodiment process of reporting pesticide use.

FIG. 5 is a flowchart of a preferred embodiment process 500 for reporting pesticide use. The process is especially useful for tracking and reporting the use of pesticide products sold to residential users, or household consumers, through retail channels.

Further details regarding a preferred embodiment for a process for reporting pesticide use may be found in U.S. patent application Ser. No. 09/603,734, filed on Jun. 23, 2000 in the names of J. Keith Kelly and Peter Stuart Edmondson, and entitled "METHOD AND SYSTEM OF TRACKING AND REPORTING PESTICIDE SALES" the entirety of which is incorporated by reference.

Figure 6A:
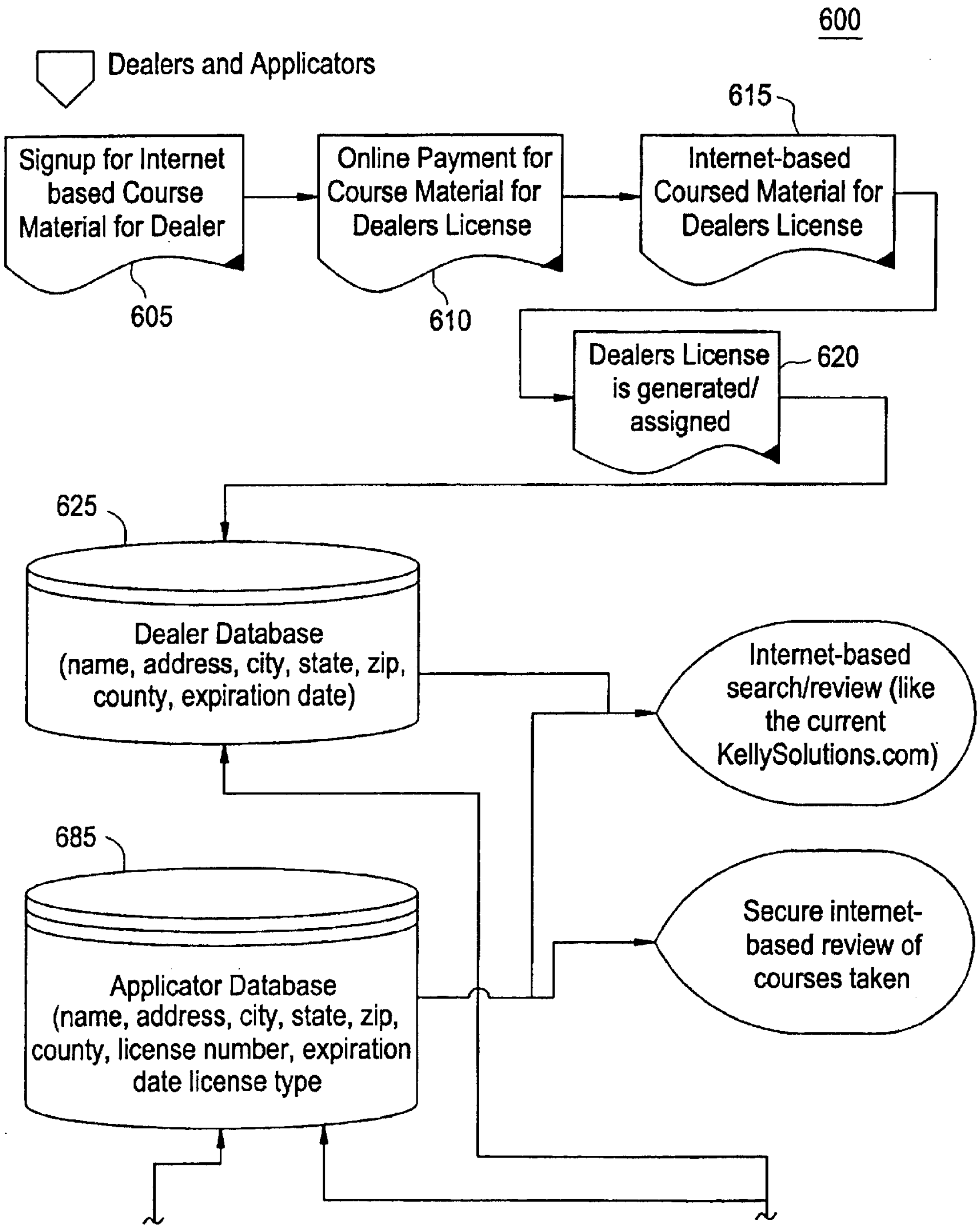
FIG. 6 is a flowchart of a preferred embodiment process of licensing pesticide dealers and pesticide applicators.
Figure 6B:
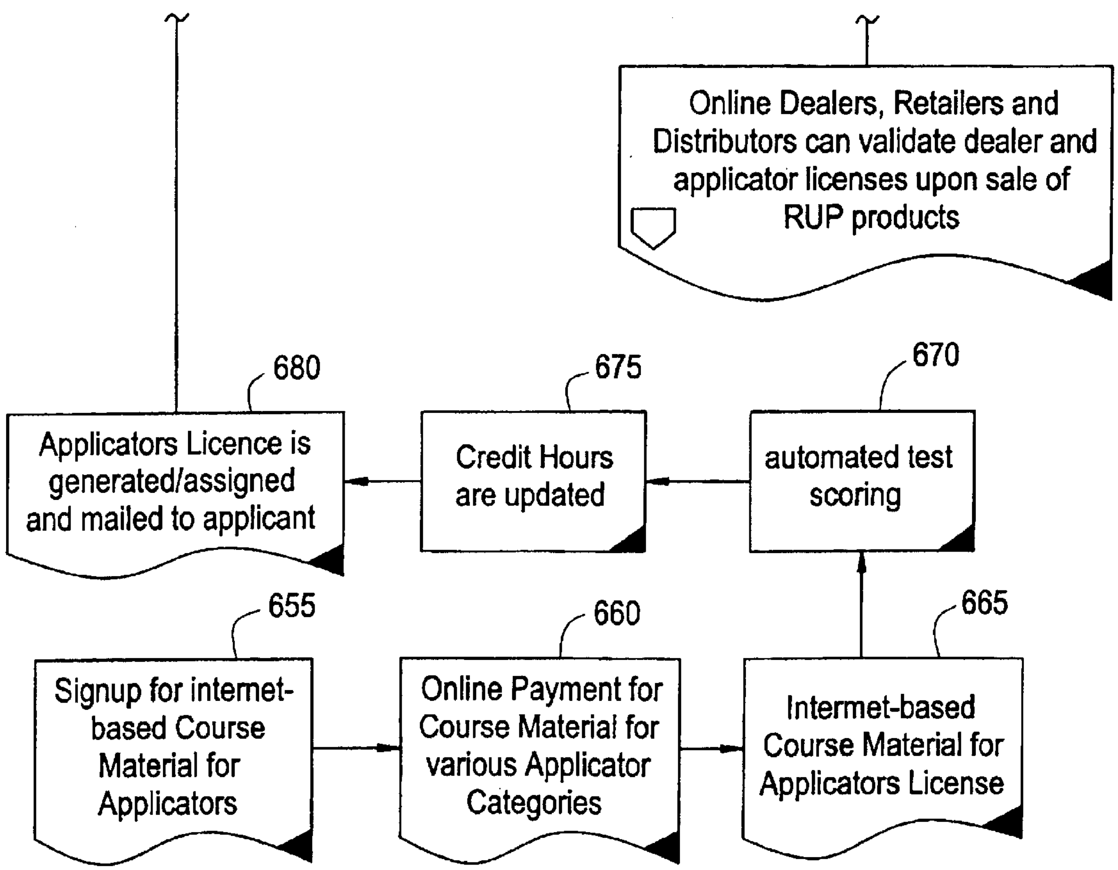

FIG. 6 is a flowchart of a preferred embodiment process 600 of licensing pesticide dealers and pesticide applicators. The process is automated and stores licensing information on a centrally accessible database or databases. The licensing data may be viewed (but not altered) via the Internet by systems and individuals in need of verifying pesticide dealer or pesticide applicator credentials before making a sale of a restricted use pesticide (RUP) product, or locating dealers or applicators, or verifying continuing education units (CEUs).

In a step 605, a prospective pesticide dealer registers for an Internet-based dealer licensing course. The registration is preferably performed by establishing an Internet connection between the dealer's user computer 110 and an agricultural product management Web site hosted by the agricultural product management computer system 130. The prospective dealer supplies a name and address (street address, city, county, state, etc.).

In a step 610, the agricultural product management Web site accepts on-line payment for course materials for the dealer licensing course.

Next, in the preferred embodiment, in a step 615 the agricultural product management Web site hosts an on-line dealer licensing course, whereby the prospective dealer receives and interacts with all course materials with his/her user computer 130 via an Internet connection. Preferably, at the end of the course, the agricultural product management Web site administers a licensing test for the prospective dealer.

If the dealer passes the licensing test, then in a step 620, a dealer license is automatically generated by the agricultural product management computer system 130 and sent to the newly-licensed dealer.

In a step 625, a Dealer database at the agricultural product management computer system 130 is updated to include a new data record having the name, address, state, license number, and expiration date for the newly-licensed dealer. An exemplary Dealer database 1350 is shown in FIG. 13B. The dealer license data stored in the dealer database 1350 may be accessed (read-only) via the Internet. Thus, the Dealer database 1350 may be used to support a process of controlling the sale of pesticide products over the Internet, as described in more detail below with respect to FIG. 10.

Similarly, in a step 655, a prospective pesticide applicator registers for an Internet-based applicator licensing course. The registration is preferably performed by establishing an Internet connection between the applicator's user computer 110 and an agricultural product management Web site hosted by the agricultural product management computer system 130. The prospective applicator supplies a name and address (street address, city, county, state, etc.).

In a step 660, the agricultural product management Web site accepts on-line payment for course materials for the applicator licensing course.

Next, in the preferred embodiment, in a step 665 the agricultural product management Web site hosts an on-line applicator licensing course, whereby the prospective applicator receives and interacts with all course materials with his/her user computer 130 via an Internet connection.

Preferably, at the end of the course, the agricultural product management Web site administers a licensing test or a certification for the prospective applicator. In that case, in a step 670, the agricultural product management Web site automatically scores the test results.

If the prospective applicator passes the licensing test, then in a step 675, a data record for the prospective applicator is updated in an applicator licensing database associated with the agricultural product management computer system 130 to reflect that the prospective applicator has passed the course and received the corresponding number of credit hours.

Once the prospective applicator has passed the initial course or attended enough courses to satisfy the state's credit hour requirements for an applicator's license, then in a step 680, an applicator license is automatically generated by the agricultural product management computer system 130 and sent to the newly-licensed applicator. Note that there are many different categories for applicator licensees depending on the types of products to be applied, where product is to be applied, etc. and therefore agricultural product management computer system 130 tracks the tests taken by a licensee or prospective licensee against each license category to determine whether the appropriate requirements have been satisfied.

In a step 685, an Applicator database at the agricultural product management computer system 130 is updated to include a new data record having the name, address, state, license number, and expiration date for the newly-licensed applicator. An exemplary Applicator database 1355 is shown in FIG. 13B. The applicator license data stored in the Applicator database 1355 may be accessed (read-only) via the Internet. Thus, the Applicator database 1355 may be used to support a process of controlling the sale of pesticide products over the Internet, as described in more detail below with respect to FIG. 10.

Also, whenever an applicator's license is scheduled to expire, the agricultural product management Web site sends a notification that the license will expire, and that the applicator has a period of time (e.g. 120 days) to satisfy the credit hour requirements to keep his/her license current. The Applicator may then complete the course requirements on-line according to the process described above upon the completion of which the Applicator database at the agricultural product management computer system 130 is updated to include the new expiration date for the licensed applicator.

Figure 7A:
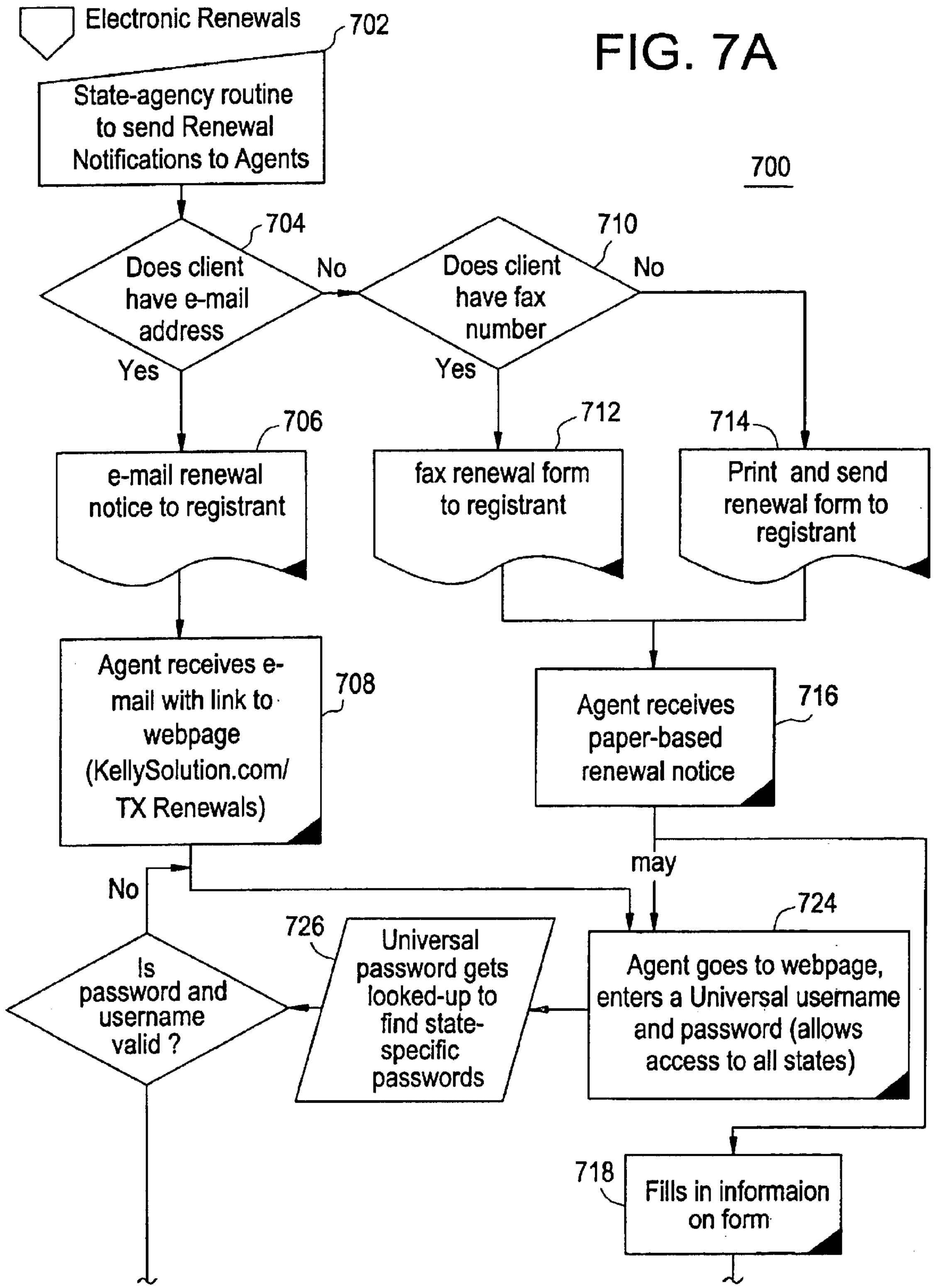
FIG. 7 is a flowchart of a preferred embodiment process for renewing registrations of agricultural products.
Figure 7B:
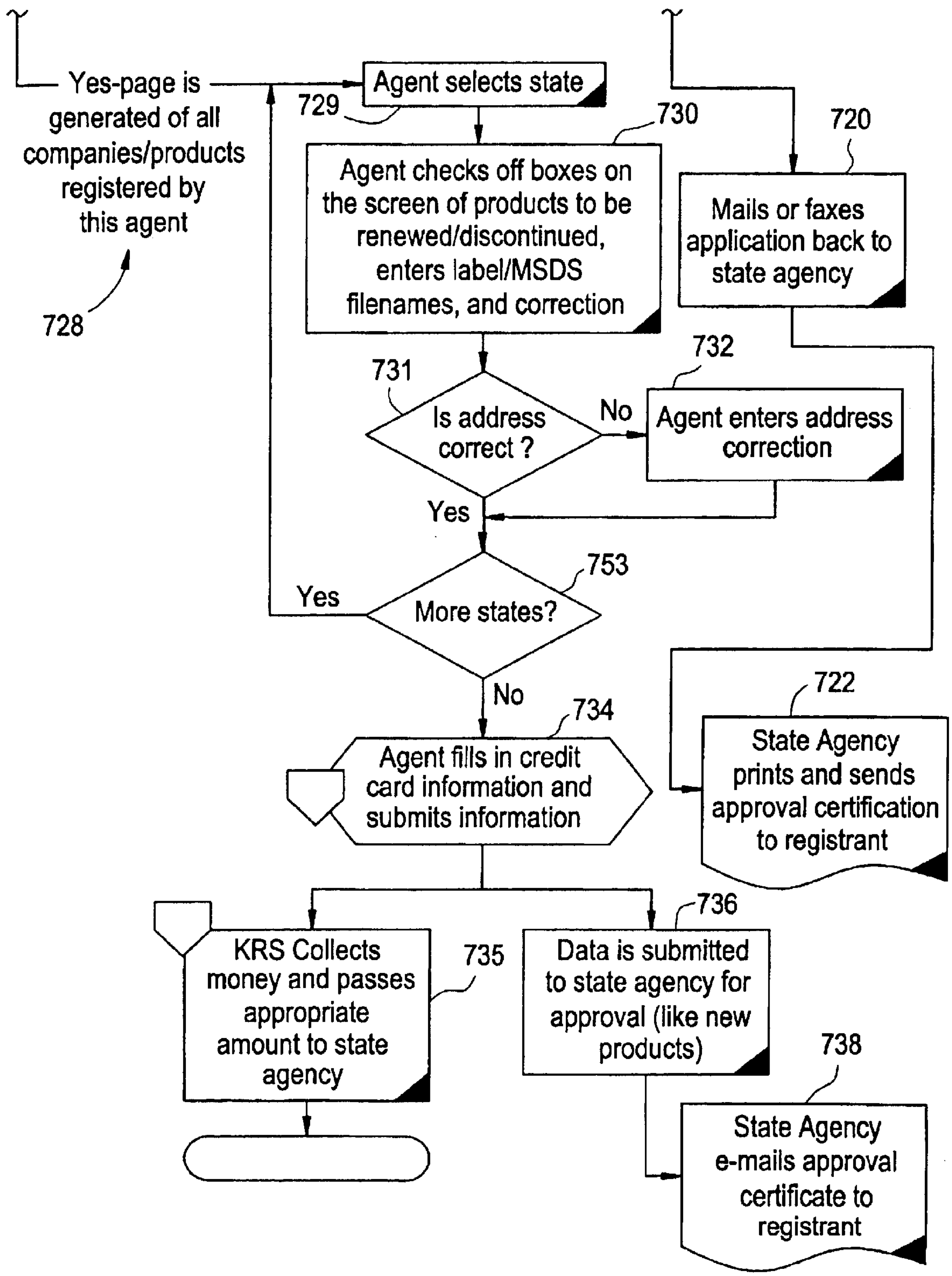

FIG. 7 is a flowchart of a process 700 for renewing registrations of agricultural products. The process automates the generation of forms compliant with the various requirements of multiple government (state) agencies. A universal username/password pair may be used to access a database of username/password pairs for many different states where a user needs to register an agricultural product.

In a step 702, the agricultural product management computer system 130 executes a software routine to automatically generate product registration renewal notices which may be sent (by mail, e-mail, fax, etc.) to companies with registered agricultural products, and their agents.

In a subsequent step 704, it is determined whether the company or agent has an e-mail address. If so, then in a step 706 the agricultural product management computer system 130 automatically sends a renewal notification e-mail message to the company or agent. In that case, in a step 708, the company or agent receives the renewal notification e-mail message. In the preferred embodiment, the message includes a hypertext link to one-stop product renewal log-in Web form of the agricultural product management Web site hosted by the agricultural product management computer system 130, whereby the company or agent may renew their product registrations). Then, the process continues at the step 724 as described below.

If, in the step 704, it is determined that the company or agent does not have an e-mail address, then in a step 710 it is determined whether the company or agent has a facsimile number. If so, then in a step 712 the agricultural product management computer system 130 automatically sends a renewal notification and renewal form by facsimile transmission to the company or agent. In the preferred embodiment, the renewal notification includes an Internet address for a one-stop product renewal home Web page of the agricultural product management Web site hosted by the agricultural product management computer system 130, whereby the company or agent may renew their product registration(s).

If, in the step 710, it is determined that the company or agent does not have a facsimile number, then in a step 714, the agricultural product management computer system 130 automatically prints a renewal form and mails a renewal notification and the renewal form to the company or agent. In the preferred embodiment, the renewal notification includes an Internet address for a one-stop product renewal home Web page of the agricultural product management Web site hosted by the agricultural product management computer system 130, whereby the company or agent may sign up to renew their product registration(s).

In a step 716, the company or agent receives the paper renewal notice—whether by facsimile or by regular mail. At this point, the company or agent may decide to access the one-stop product renewal home Web page to perform a product renewal. In that case, the company or agent connects a user computer 110 to the agricultural product management Web site and loads the one-stop product renewal home Web page into a Web browser installed on the user computer 110. Preferably, the one-stop product renewal home Web page includes a hypertext link to a Web form whereby the company or agent may sign-up with the one-stop product renewal service. Once the company or agent signs up, it is assigned a universal username and universal password for accessing the service. Then the process continues at the step 724 as described below.

If the company or agent decides to perform a paper-based renewal, then in a step 718, the company or agent manually fills in the renewal form. Then, in a step 720, the company or agent sends the completed renewal form back to the state agency, either by mail or by facsimile transmission. Finally, in a step 722, the state agency prints and mails a product approval certificate to the company or agent. If the renewal includes e-mail or fax addresses, then the certificate may be e-mailed or faxed.

Typically, a company may have many agricultural products for which it must renew registrations. Moreover, the company may have registrations for each product in all 50 U.S. states. Therefore, there may a large amount of paperwork involved in annual renewals.

Accordingly, a one-stop product renewal system and process has been developed by the present inventors. Through the one-stop product renewal system and process, a company or agent may renew registrations for one or more of its products in a plurality of states (hereinafter referred to as "the participating states") through a single log-in process.

In a preferred embodiment system and process disclosed herein, the agricultural product management computer system 130 hosts the agricultural product management Web site, including a one-stop product renewal log-in Web form which allows a company or agent to renew registrations for one or more of its products in the participating states through a single submission. The one-stop product renewal log-in Web form operates in conjunction with a multi-state database. The multi-state database includes a data record for each company or agent which renews product registrations through the agricultural product management Web site. Each data record includes a universal username field, a universal password field, and a plurality of state username fields and state password fields corresponding to each participating state for which a company or agent may renew a product registration through the one-stop product renewal process. Through the multi state database, a company or agent may supply a single username and password, and the agricultural product management computer system 130 hosting the agricultural product management Web site may thereby obtain the usernames and passwords for each participating state in which the company or agent has registered products.

In accordance with this embodiment, in a step 724 a company or agent establishes an Internet connection between a user computer 110 and the agricultural product management computer system 130 hosting the agricultural product management Web site. The agricultural product management computer system 130 transmits a one-stop product renewal log-in Web form to the user computer 110. At this time, the company or agent enters into the one-stop product renewal log-in Web form a universal username and a universal password which is used to access a data record in the multi-state database. The one-stop product renewal log-in Web form is then transmitted back from the user computer 110 to the agricultural product management computer system 130.

Advantageously, the universal username and a universal password allow the agricultural product management computer system 130 hosting the agricultural product management Web site to authenticate the user for performing on-line product renewals for all of the participating states.

In a step 726, the multi-state database is searched to find a data record having the universal username and universal password. If the universal username and universal password is not found in the multi state database, then the process returns to the step 724 wherein the company or agent supplies a new universal username and universal password.

If the universal username and universal password is found in the multi-state database, then in a step 728, a product registration Web form, listing all products registered by the company or agent, is generated and transmitted to the company or agent's user computer 110. In the case of an agent, a company registration Web form, listing all companies having products registered by the agent, may first be generated and transmitted to the agent's user computer 110, and the agent can then select a company from the list, and then the product registration Web form for the selected company is generated and transmitted to the agent's user computer 110.

Next, in a step 729, the company or agent selects and indicates a state in which it wants to renew and/or discontinue product registrations.

Next, in a step 730, the company or agent selects all of the products which it desires to renew, discontinue, or cancel for the participating state.

Then, in a step 731, an information form is transmitted from the agricultural product management computer system 130 hosting the agricultural product management Web site to the company or agent for supplying a change of address or other changes of information.

If the address of the company or agent is not correct, then in a step 732, the agent enters an address correction and submits this information back to the agricultural product management computer system 130 hosts the agricultural product management Web site.

In a step 733, the company or agent indicates whether there are additional states for which it desires to renew, discontinue, or cancel product registrations.

If there are additional states, then the process returns to the step 729 where the company or agent indicates the next state.

If there are no more additional states, then the process continues at a step 734, wherein the company or agent supplies credit card information against which the charges for the state registration renewals may be billed. Preferably, the credit card is entered into appropriate data entry boxes of a Web form supplied by agricultural product management Web site to a user computer 110 for the company or agent.

In a step 735, the one-stop renewal process automatically bills a registration renewal fee or fees against the company's or agent's credit card. Preferably, the Applicant receives e-mail confirmation of the renewal requests and the credit card charges.

Meanwhile, in a step 736, the registration renewal data is submitted to the selected participating state(s) according to the product registration(s) being renewed in the state(s). Preferably, the multi-state database is accessed to retrieve the state username(s) and/or state password(s) for the company or agent for each participating state in which a product or products are being renewed, discontinued, etc. Using this username and password, the agricultural product management computer system 130 may automate a process of logging-in to the selected participating state's renewal system and submitting on behalf of the company or agent the product renewal application and at least a subset of the renewal data supplied by the company or agent. For each selected participating state, a state agent reviews and approves the renewal application.

Preferably, the renewal data is submitted in a standardized format accepted by the state, for example in a standard (e.g., MICROSOFT EXCEL) spreadsheet or standard (e.g., MICROSOFT ACCESS) database.

This review and approval process may be performed according to the processes 1100 or 1200 (depending upon whether the product is a pesticide or fertilizer) as will be described in more detail below with respect to FIGS. 11 and 12.

Finally, in a step 738, an appropriate agency for the participating state sends to the company or agent an e-mail message containing one or more product approval certificates.

Then, the process returns to the step 728 and is repeated for each participating state. It is understood that the order of the steps in the process 700 may be rearranged without departing from the present invention.

Figure 8A:
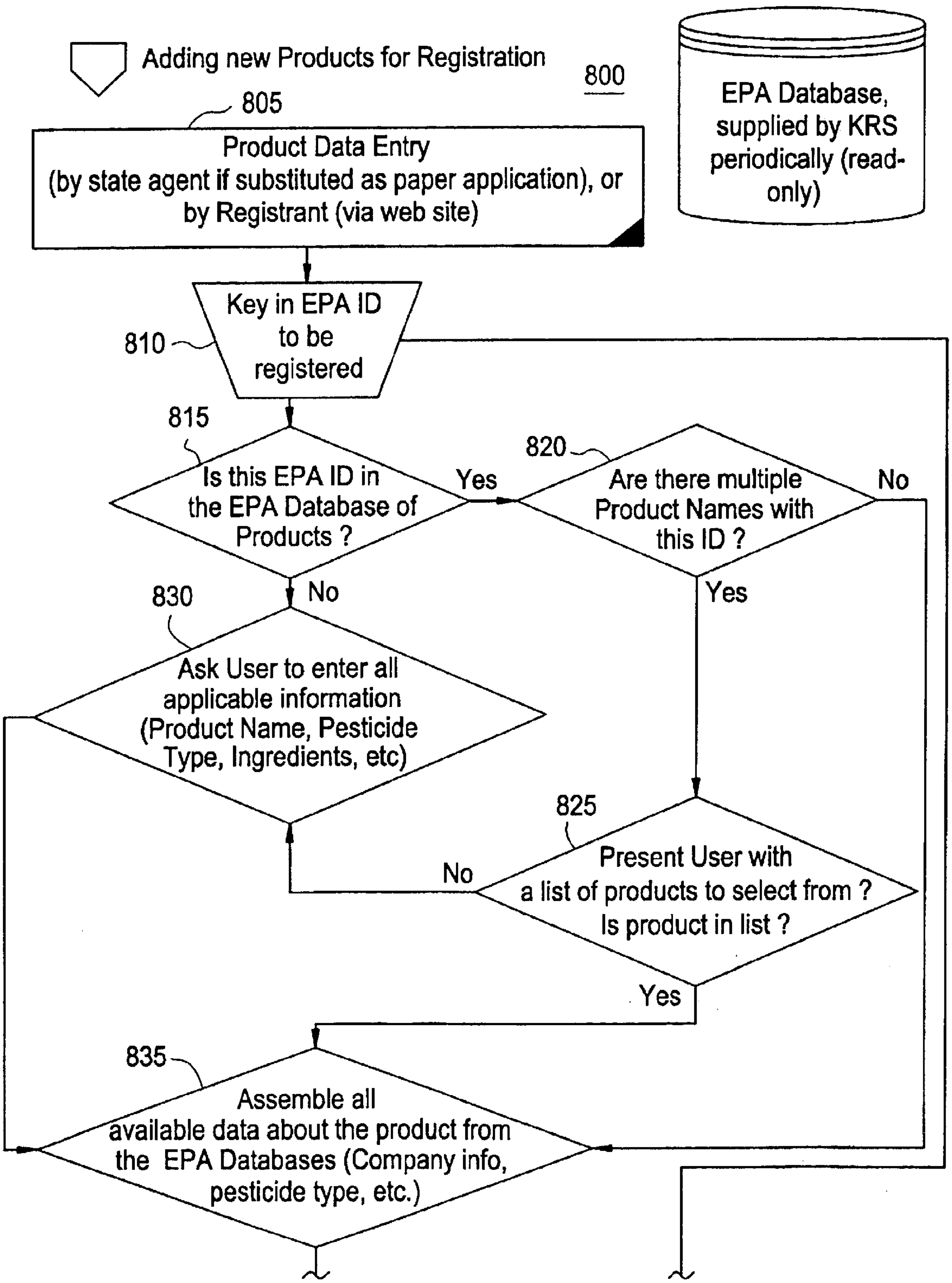
FIG. 8 is a flowchart of a preferred embodiment process for submitting new agricultural products for registration.
Figure 8B:
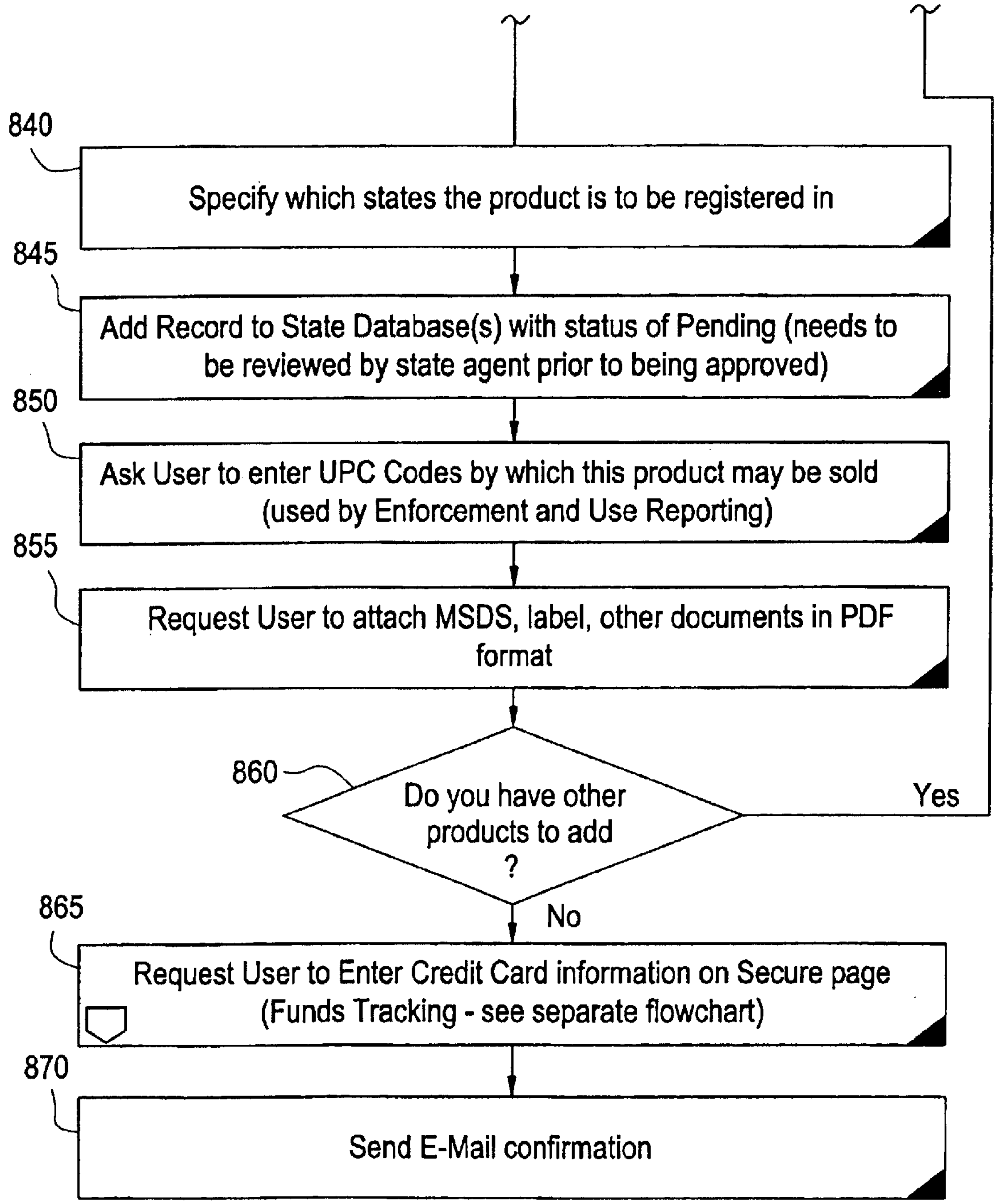

FIG. 8 is a flowchart of an application process 800 for submitting pesticide products for initial approval and registration in one or more states. The process 800 allows the simultaneous application for approval and registration of one or more new pesticide products by many different jurisdictions (states).

In a step 805, product data for a pesticide product being submitted for approval and registration is entered into a new product registration application form provided by an agricultural product management computer system 130. Product data may be manually entered into the new product registration application form by an approved operator, or may be submitted to the agricultural product management computer system 130 by an applicant company or agent in a Web-based new product registration application form via the Internet.

In a step 810, the operator keys into the new product registration application form an EPA ID for the pesticide product to be approved and registered.

Figure 14A:
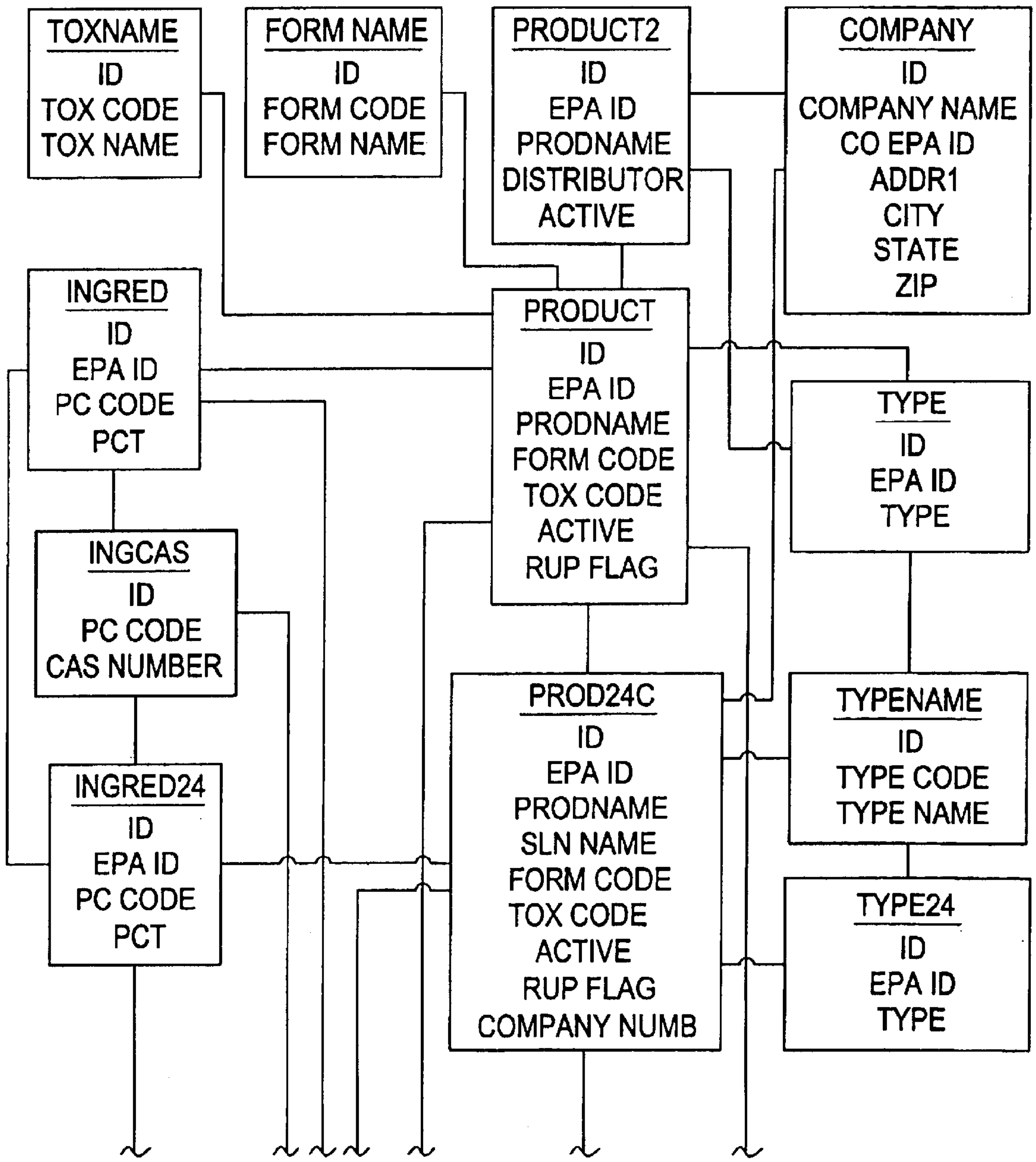
FIG. 14 is a diagram showing a database structure and interrelationships of government environmental protection agency (EPA) pesticide data in the database.
Figure 14B:
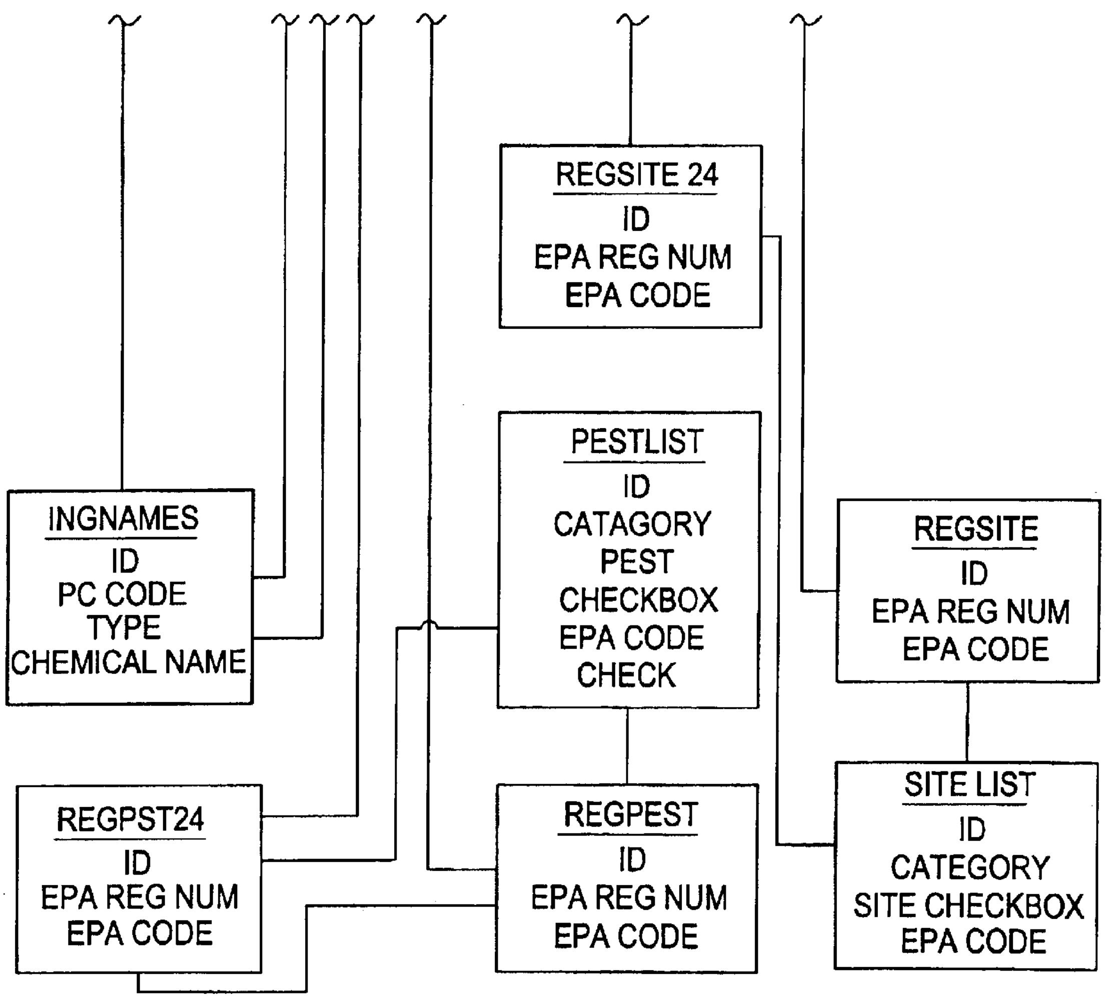

In a step 815, the agricultural product management computer system 130 checks to determine whether the EPA ID is found in an EPA database, which may be the EPA database 1400 illustrated in FIG. 14. If not, then the process continues in a step 830 described below.

If the EPA ID is found in the EPA database, then in a step 820, the EPA database is checked to determine whether there are multiple pesticide products having the same EPA ID. If not, then there is only one pesticide product having the EPA ID, and in a step 835, data for the pesticide product from the EPA database is assembled into the new product registration application form. Such data preferably includes, applicant company data, a pesticide type, etc. Then the process continues at the step 840 described below.

If multiple pesticide products having the same EPA ID are found in the EPA database, then in a step 825 the agricultural product management computer system 130 presents to the operator a list of all pesticide products matching the EPA ID. The operator reads the list and determines whether the new pesticide product being submitted for approval and registration is found in the list. If so, then the process continues at the step 835 described above.

If the operator does not find the new pesticide product being submitted for approval and registration in the list, then in a step 830 the agricultural product management computer system 130 asks the operator to supply all applicable information. Then the process continues in the step 835, wherein the operator manually enters all applicable information into the new product registration application form. Such information may include a product name, a pesticide type, active ingredients, etc.

Typically, a company may have many new pesticide products which it must register. Moreover, the company may want to register a new pesticide product in all 50 U.S. states.

Accordingly, a one-stop new product application system and process has been developed by the present inventors. Through the one-stop new product application system and process, a company or agent may submit one or more new products for approval and registration in a plurality of states (hereinafter referred to as "the participating states") through a single submission.

Accordingly, in a step 840, the operator identifies each state where the applicant company wants to submit the new pesticide product for approval and registration.

Then, in a step 845, the agricultural product management computer system 130 automatically adds a new record to a state product database for each selected state where the new pesticide product is to be submitted. At the same time, a "Status" field for the record is marked with a "Pending" status. The record will subsequently be reviewed by a state agent in each selected state who, upon product approval, will change the status field from "Pending" to "Approved." This review and approval process may be performed according to the process 1100 as will be described in more detail below.

In a step 850, the agricultural product management computer system 130 asks the operator to provide one or more UPCs by which the pesticide product may be sold. In response, the operator enters the requested information.

Then, in a step 855, the agricultural product management computer system 130 asks the operator to provide various documents pertaining to the new product being submitted, for example, a material safety data sheet (MSDS), a product label, etc. In a preferred embodiment, the operator may download electronic copies of the documents to the agricultural product management computer system 130. The electronic copies may be formatted in a standard file format, such as ADOBE® ACROBAT®.

Next, in a step 860, the agricultural product management computer system 130 asks the operator whether there are other new pesticide products to be submitted for approval and registration. If so, then the process returns to the step 810.

If there are no more new pesticide products to be submitted, then in a step 865 the agricultural product management computer system 130 asks the operator to provide billing data, such as credit card data, virtual checks, paypal, etc. which can be billed for the registration of the new product(s). In response, the operator enters the requested information.

Finally, in a step 865, the agricultural product management computer system 130 automatically sends a confirmation message to the company which has submitted the new product(s) for approval and registration. Preferably, the confirmation is transmitted via an e-mail message.

Although the process 800 described above applies particularly to pesticide products, a similar process may be used to submit other new non-pesticide agricultural products for initial approval and registration in one or more states. In that case the process is the same, except that the steps of looking-up and cross-referencing an EPA ID in steps 810–825 are not performed, and instead the operator may manually supply the all applicable information, such as in the step 830. Also, when the product is a fertilizer instead of a pesticide, the review and approval performed in the step 845 may be performed according to the process 1200.

Figure 9A:
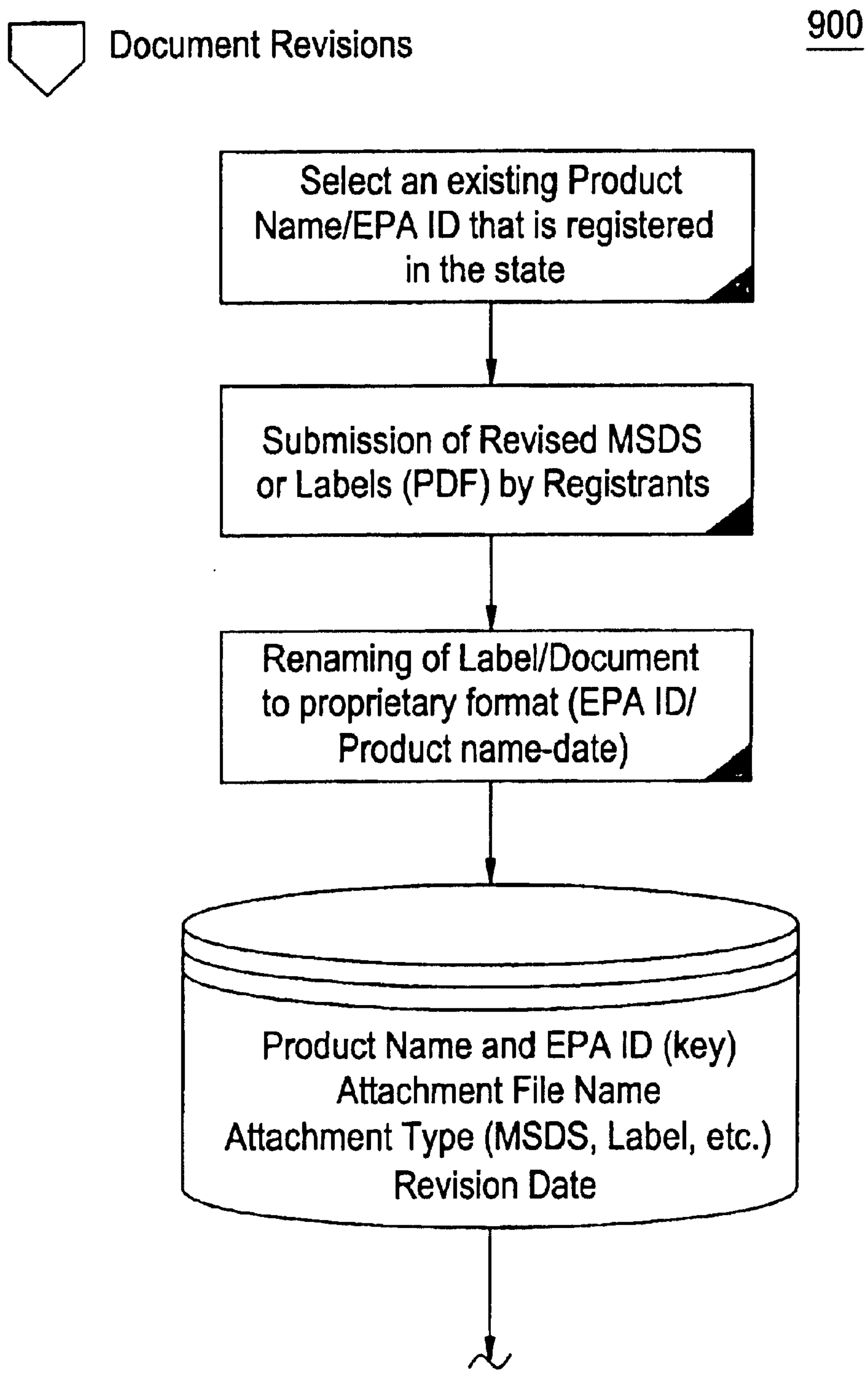
FIG. 9 is a flowchart of a preferred embodiment process for managing documents of an agricultural product management computer system.
Figure 9B:
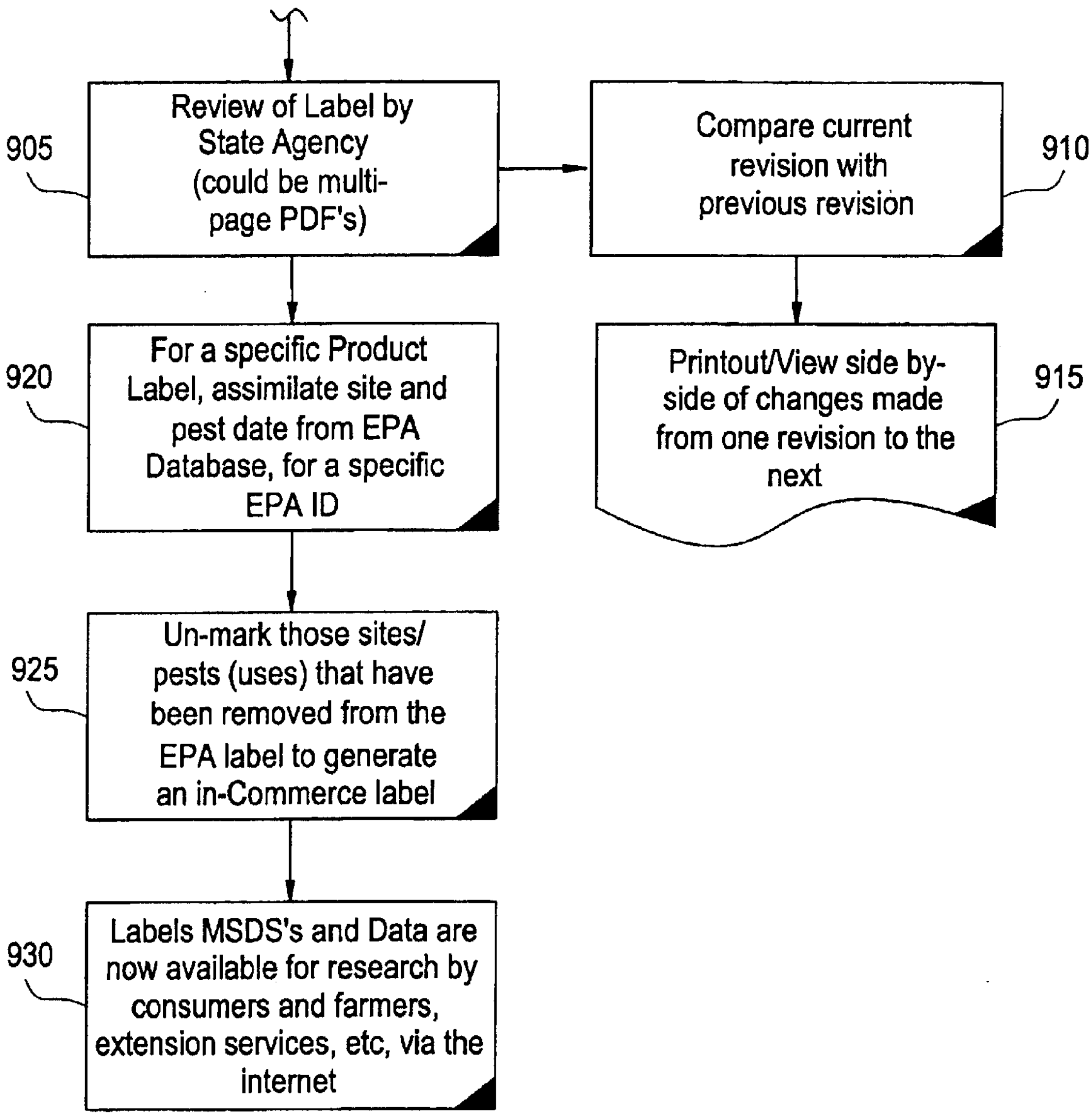

FIG. 9 is a flowchart of a process for managing documents of an agricultural product management computer system.

In a step 905 a state agent at a state agency reviews a product label.

In a step 910, the agent may indicate a desire to compare a current version or revision to a label with a previous revision. In that case, in a step 915, the agent may view new and old versions of a product label side-by-side on a display monitor of the agricultural product management computer system 130.

In a step 920, for a specific product label, the agent assimilates site and pest data from an EPA database for a specific EPA ID. The EPA database may be the EPA database 1400 illustrated in FIG. 14.

Then, in a step 925, the agent un-marks those sites and/or pests that have been removed from the EPA Label to generate an In-Commerce label. Preferably, an electronic copy of the In-Commerce label is stored at the agricultural product management computer system 130. The electronic copy may be formatted in a standard file format, such as ADOBE® ACROBAT®.

Finally, in a step 930, the EPA Label, In-Commerce Label, the MSDS, and other data are now available for research by consumers, farmers, extension services, etc. via the Internet. A researcher may cross-reference this data with the EPA database to provide the researcher with other product information, such as ingredients, pesticide types and formulations.

Figure 10:
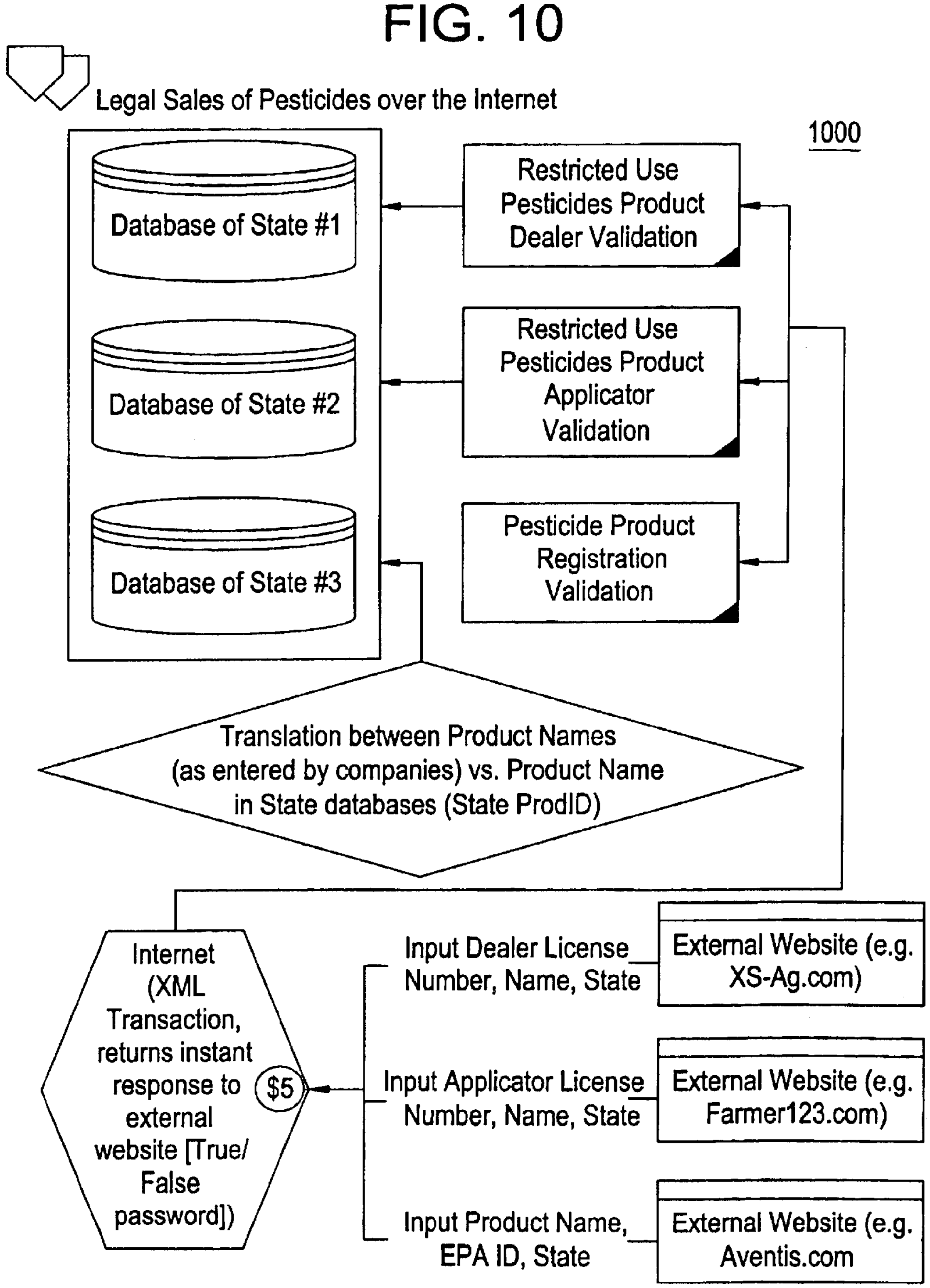
FIG. 10 is a flowchart of a preferred embodiment of an automated back-end process for verifying pesticide dealer and applicator licenses in support of Internet pesticide sales.

FIG. 10 is a flowchart of an automated back-end process 1000 for verifying pesticide dealer and applicator licenses in support of Internet pesticide sales.

Further details regarding a preferred embodiment for a back-end process for verifying pesticide dealer and applicator licenses in support of Internet pesticide sales may be found in U.S. patent application Ser. No. 09/662,492, filed on Sep. 15, 2000 in the names of J. Keith Kelly and Peter Stuart Edmondson, and entitled "SYSTEM AND METHOD OF PROVIDING AGRICULTURAL PESTICIDE INFORMATION AND FACILITATING SALES OF PESTICIDE PRODUCTS" the entirety of which is incorporated by reference.

Figure 11:
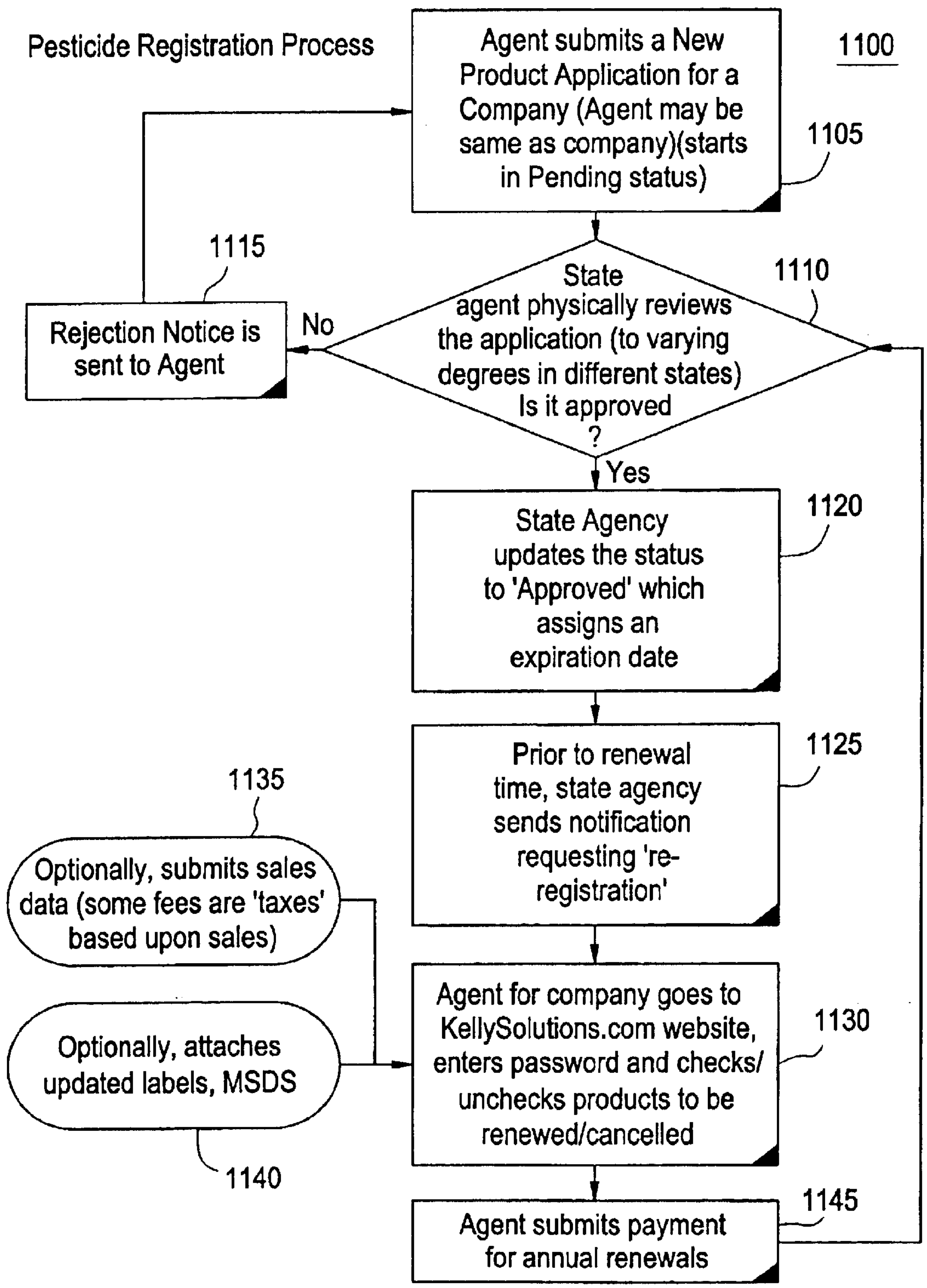
FIG. 11 is a flowchart of a preferred embodiment process for a state or other government agency to register pesticide products.

FIG. 11 is a flowchart of a process for a state or other government agency to approve and register pesticide products. The process allows a government agency to provide a final check or gate before an agricultural product is approved for sale.

In a first step 1105, a company or agent submits a new product application for approval and registration. The submission may be accomplished through a one-stop new product application system and process such as the process 800 described above with respect to FIG. 8.

In a next step 1110, a state agent physically reviews the new product application and determines whether it will be approved.

If the new product application is rejected, then in a step 1115 a rejection notice is sent to the company or agent.

If the new product application is approved, then in a step 1120, the state agent updates a status field from "Pending" to "Approved" in a record for the new product in a state product database.

Prior to a time when the product's registration is due for renewal, in a step 1125, the state agency sends a renewal notification to the responsible company or agent. Preferably, such notification is sent electronically, via an e-mail message, for example.

Then, in the steps 1130 through 1145, the company or agent may connect a user computer with an agricultural product management Web site to renew the product registration and, where necessary, submit new or update labels, sales data, or other information. At that time, the company or agent pays a renewal fee. Preferably, the renewal process may be performed according to the one-stop product renewal system and process described above with respect to FIG. 7.

Figure 12A:
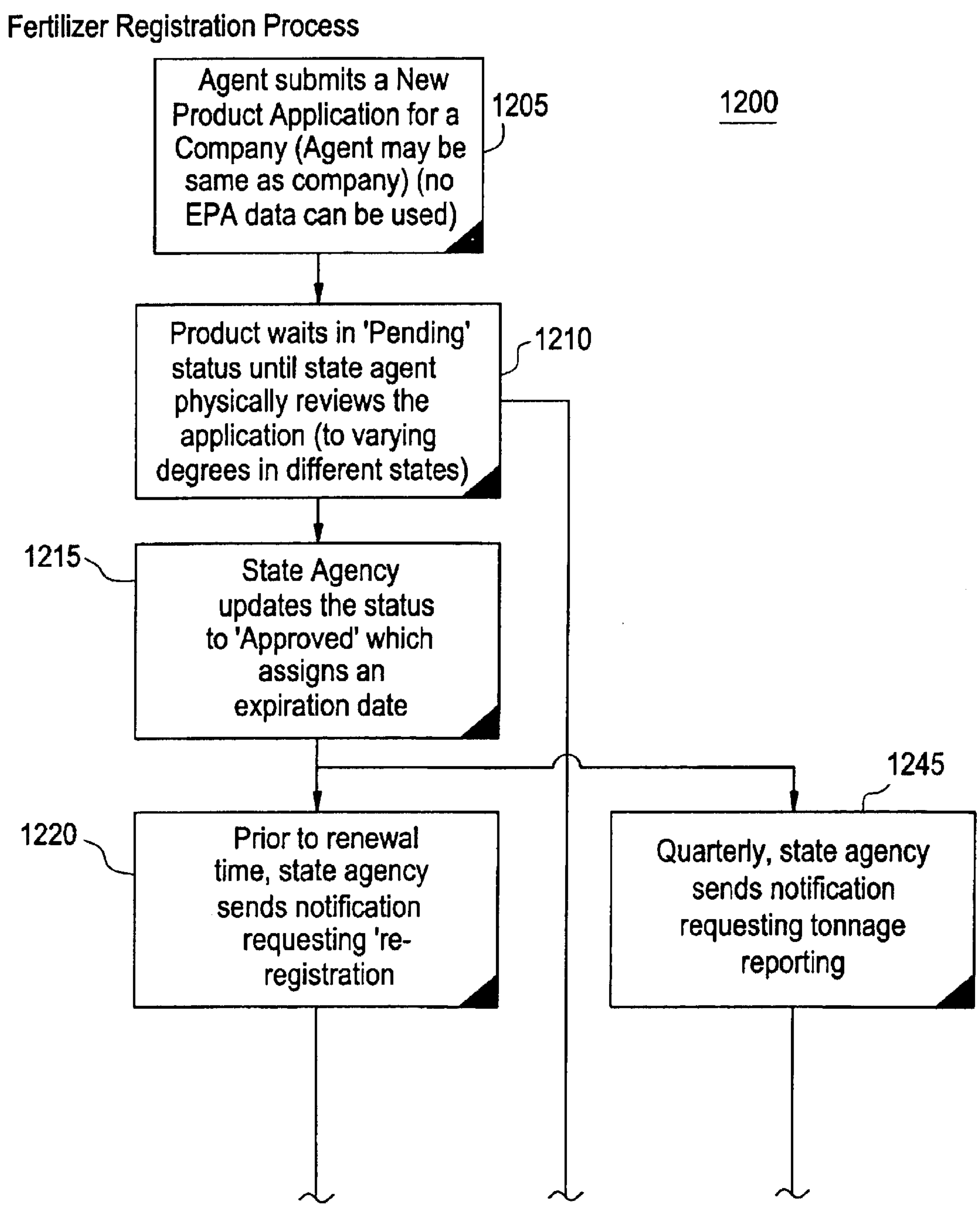
FIG. 12 is a flowchart of a preferred embodiment process for a state or other government agency to register fertilizer products.
Figure 12B:
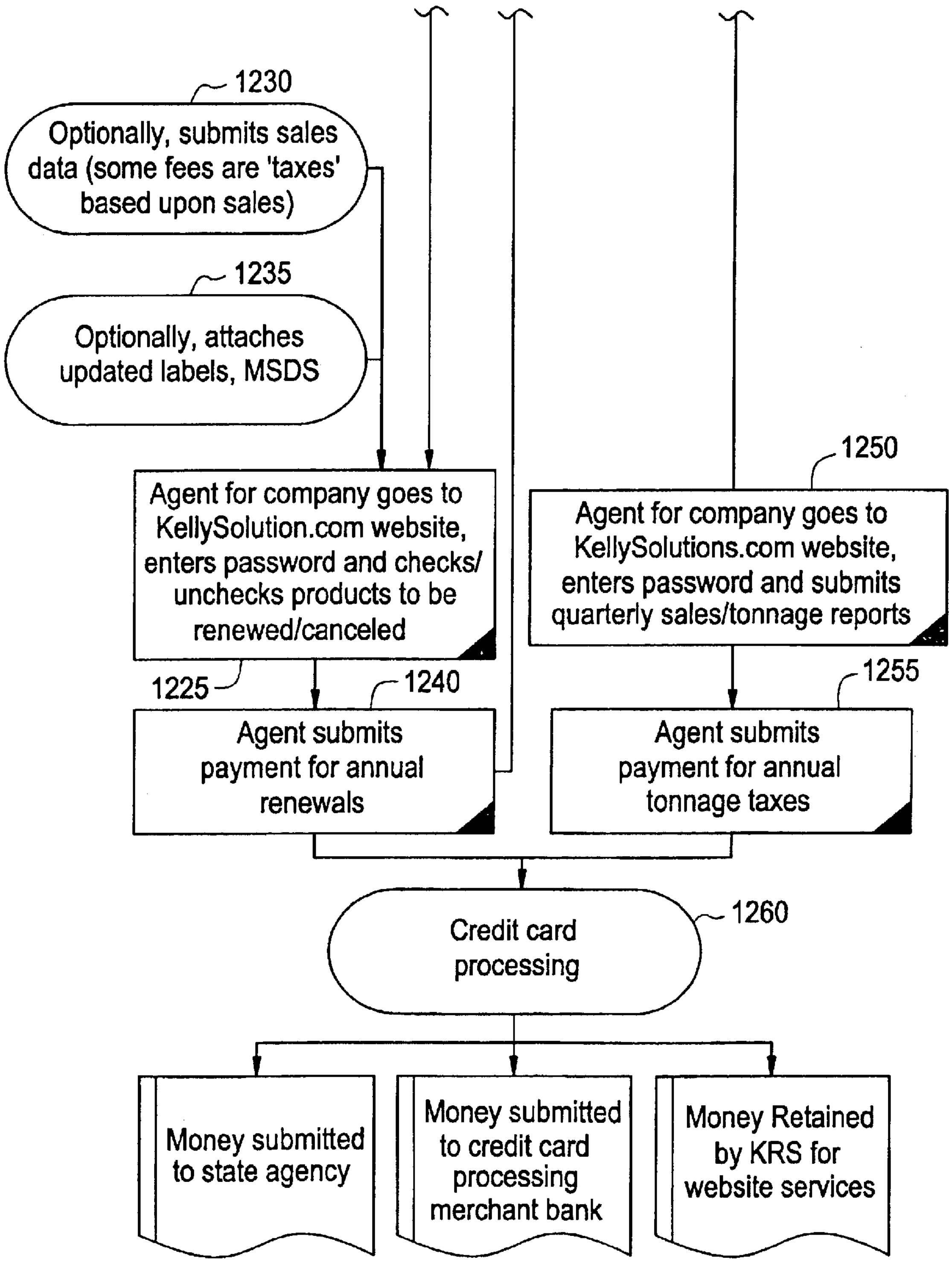

FIG. 12 is a flowchart of a process for a state or other government agency to register fertilizer products. The process allows a government agency to provide a final check or gate before user-supplied data is entered into government databases.

In a first step 1205, a company or agent submits a new product application for approval and registration. The submission may be accomplished through one-stop new product application system and process such as the process 800 described above with respect to FIG. 8.

In a next step 1210, a state agent physically reviews the new product application and determines whether it will be approved.

Once the agent approves the product, then in a step 1215, the state agent updates a status field from "Pending" to "Approved" in a record for the new product in a state product database. At that time, the sate agent also assigns an expiration date to the product registration, and enters that date into a corresponding field for the record for the new product in the state product database.

Prior to a time when the product's registration is due for renewal, in a step 1220, the state agency sends a renewal notification to the responsible company or agent. Preferably, such notification is sent electronically, via an e-mail message, for example.

Then, in the steps 1225 through 1240, the company or agent may connect a user computer with an agricultural product management Web site to renew the product registration and, where necessary, submit new or update labels, sales data, or other information. At that time, the company or agent pays a renewal fee. Preferably, the renewal process may be performed according to the one-stop product renewal system and process described above with respect to FIG. 7.

Meanwhile, in a step 1245, periodically (e.g., quarterly) the state agency sends a notification to the responsible company or agent requesting that it supply sales volume data, for example, the tonnage of product sold during the previous quarter.

In response to the notification, in a step 1250 the company or agent may connect a user computer with an agricultural product management Web site to submit the quarterly sales/tonnage data. Preferably, the company or agent logs-in to a secure part of the agricultural product management Web site using a pre-assigned username and password.

In a preferred embodiment, a company or agent may submit quarterly sales/tonnage data for a plurality of participating states through a one-stop reporting process. In that case, the company or agent may access a one-stop reporting portion of the agricultural product management Web site by submitting a universal username and universal password, as was described before with respect to the process 700 illustrated in FIG. 7.

Next, in a step 1255, the company or agent pays a tonnage tax on the fertilizer product.

In a step 1260, renewal fees and/or tonnage taxes are automatically collected by the agricultural product management computer system 130 against a credit card account or other electronic account supplied by the company or agent. A portion of the fees are retained as a service charge by a host of the agricultural product management computer system 130, and the balance are forwarded to the appropriate state agency.

Figures 1, 13A:
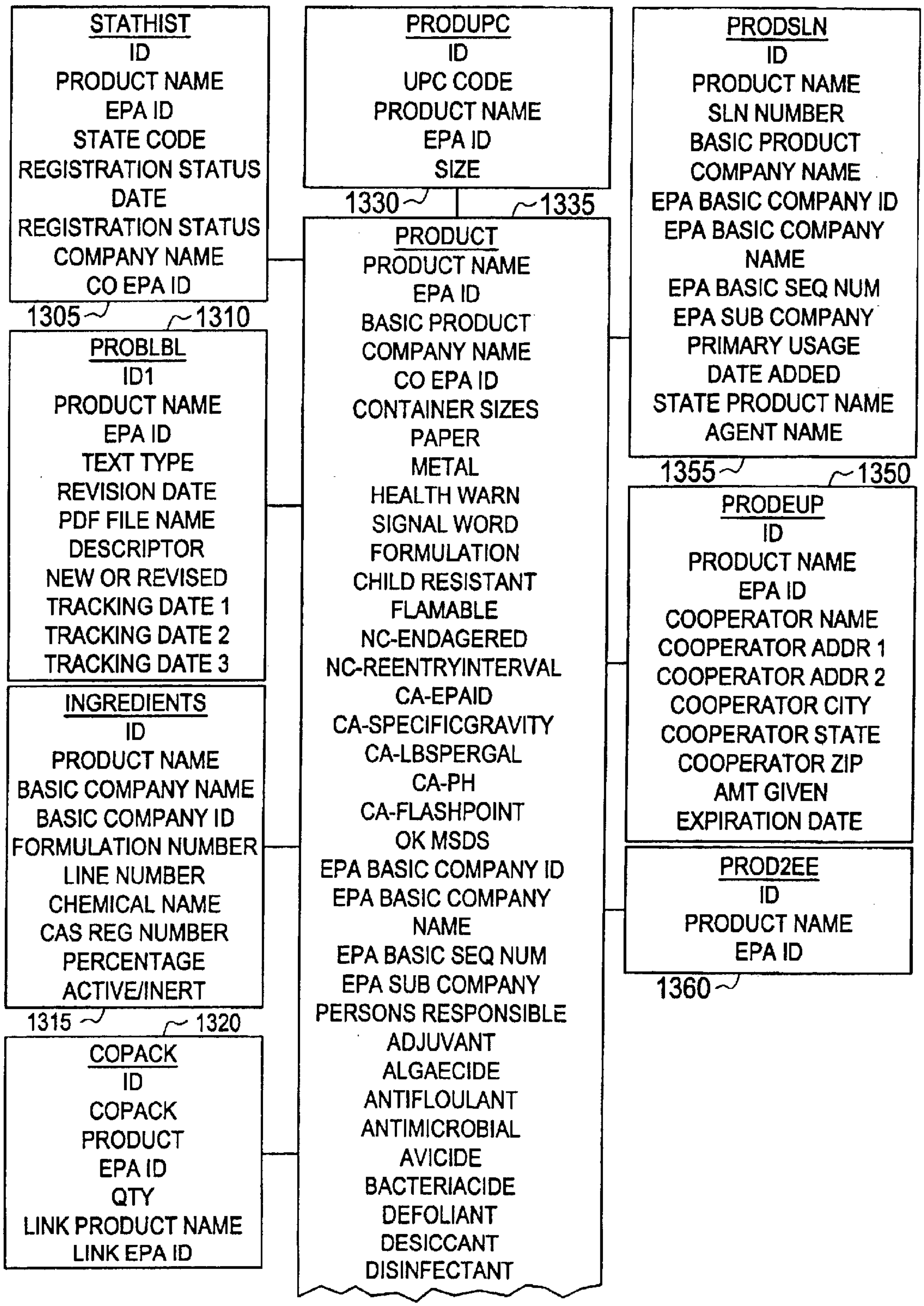
FIGS. 13A–C show various databases used in a preferred embodiment system and process for managing agricultural product information, and for facilitating the controlled sale, distribution, and use of agricultural products.
Figures 2, 13A:
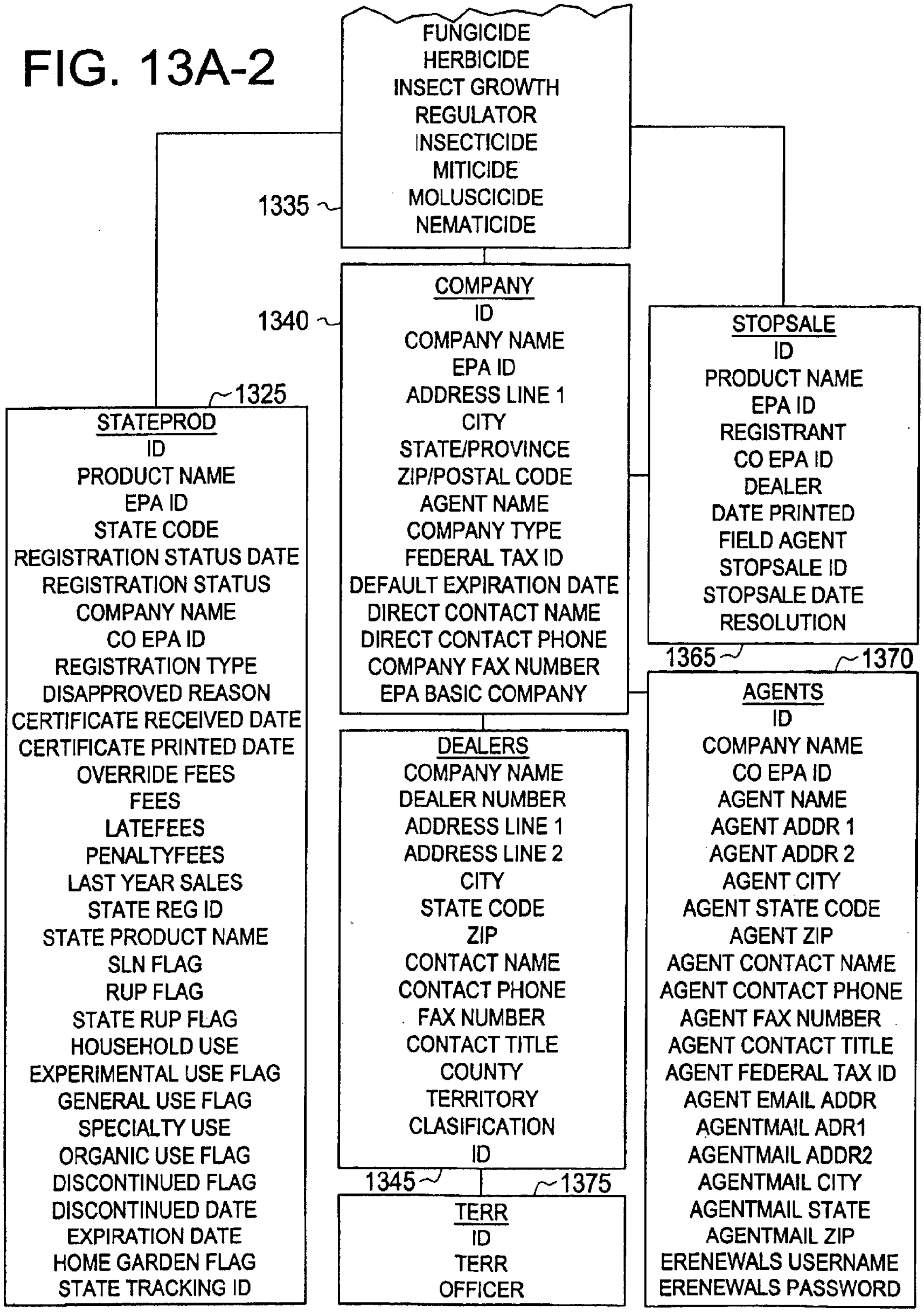
Figure 13B:
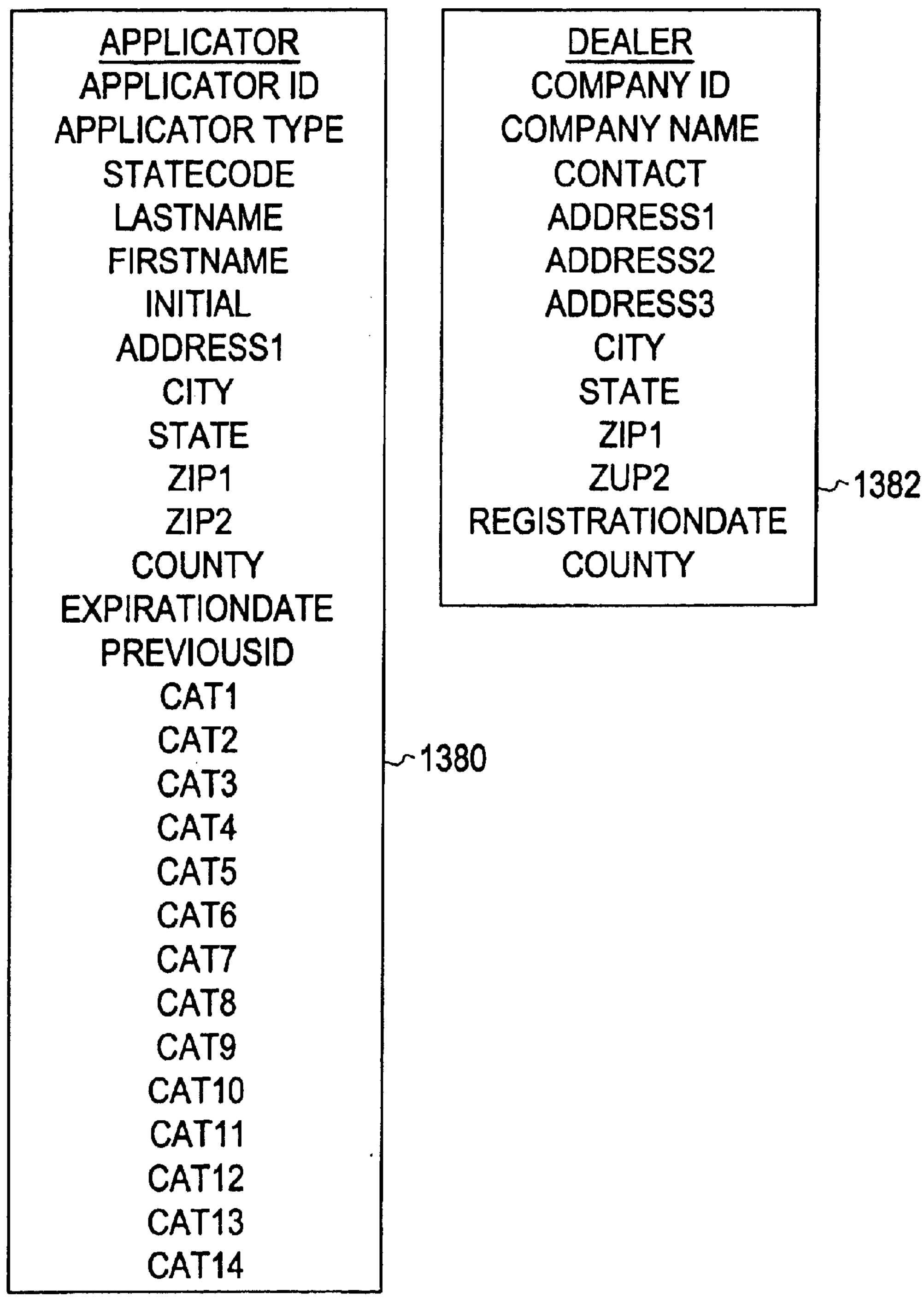
Figure 13C:
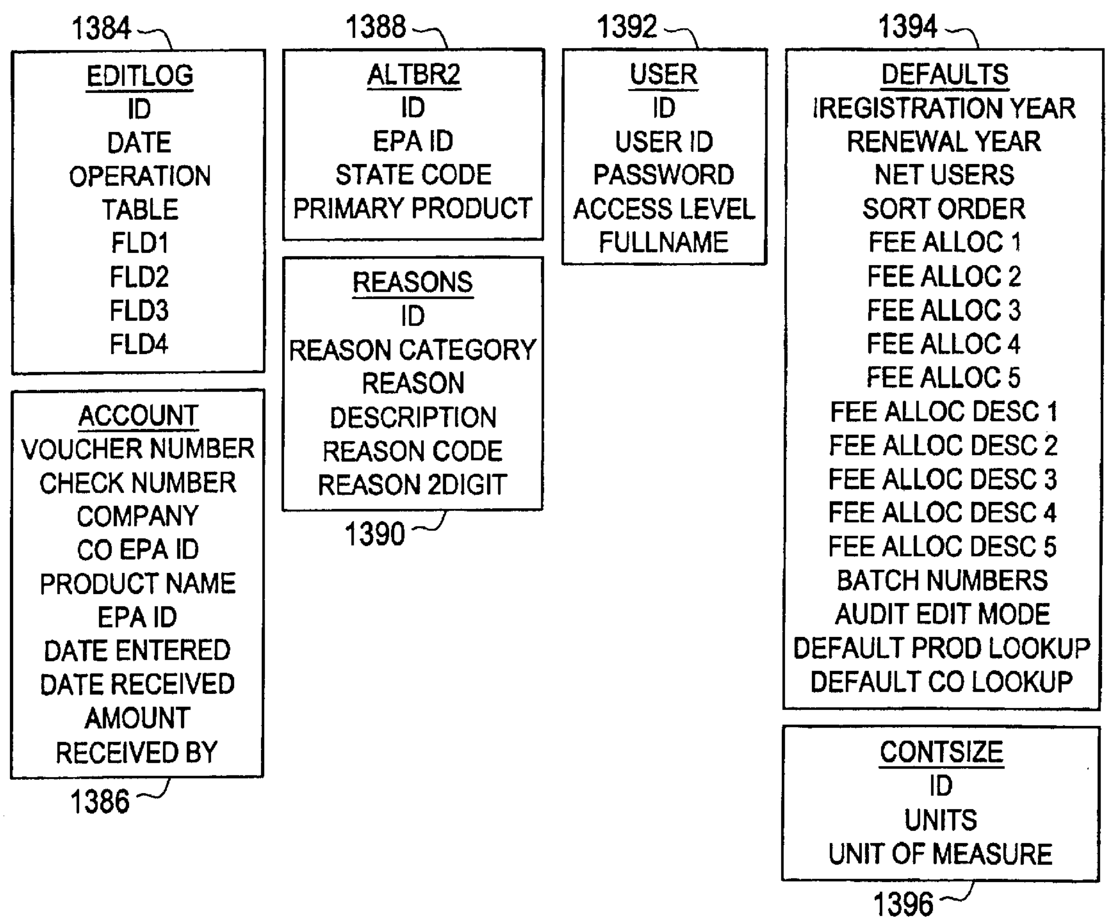

FIGS. 13A–C illustrate interrelationships of databases used in a system and process for managing agricultural product information, and for facilitating the controlled sale, distribution, and use of agricultural products. The databases shown in FIGS. 13A–C are managed by a database administration module 260 of the agricultural product management computer system 130.

Illustrated in FIG. 13A are a status history (STATHIST) database 1305 maintains an audit trail on all changes made to a product through its history, a product label (PROBLBL) database 1310, an ingredients (INGREDIENTS) database 1315, a co-packaging (COPACK) or twinpack database 1320, a product status (STATPROD) database 1325, a product UPC (PRODUPC) database 1330, a product (PRODUCT) database 1335, a company (COMPANY) database 1340, a dealers (DEALERS) database 1345, a product experimental use permit (PRODEUP) database 1350, a product special local need (PRODSLN) database 1355, a product Section 2EE(PROD2EE) database 1360, a stop-sale (STOPSALE) database 1365, an agents (AGENTS) database 1370, and a territory (TERR) database 1375.

Illustrated in FIG. 13B are an applicator (APPLICATOR) database 1380 and a dealer (DEALERS) database 1382. Illustrated in FIG. 13C are internal databases used by the agricultural product management computer system 130, including an edit log (EDITLOG) database 1384, an account (ACCOUNT) database 1386, an alternate brand names (ALTBR2) database 1388, a rejection reasons (REASONS) database 1390, a user (USER) database 1392, a default parameters (DEFAULTS) database 1394, and a container size (CONTSIZE) database 1396.

FIG. 14 is a diagram showing a database structure and interrelationships of government environmental protection agency (EPA) pesticide data in such database. EPA data is automatically cross-referenced with state data to manage agricultural product information, and to facilitate the controlled sale, distribution, and use of agricultural products.

Illustrated in FIG. 14 are a toxic name (TOXCODE) database 1402, an ingredient (INGRED) database 1404, an ingredient chemical abstract society (INGCAS) database 1406, an ingredient SLN (section 24) (INGRED24) database 1408, an ingredient names (INGNAMES) database 1410, a registered pest SLN (REGPST24) database 1412, a formulation name (FORM NAME) database 1414, a first product (PRODUCT) database 1416, a second product (PRODUCT2) database 1418, a product SLN (PROD24C) database 1420, a registered site (REGSIT24) database 1422, a master pest list (PESTLIST) database 1424 which lists all pests covered by any product, a registered pest (REGPEST) database 1426, a company (COMPANY) database 1428, a pesticide types (TYPE) database 1430, a pesticide type name (TYPENAME) database 1432, a pesticide types SLN (TYPE24) database 1434, a registered site (REGSITE) database 1436, and a master site list (SITELIST) database 1438 of all sites and crops to which agricultural products can be applied.

Figure 15:
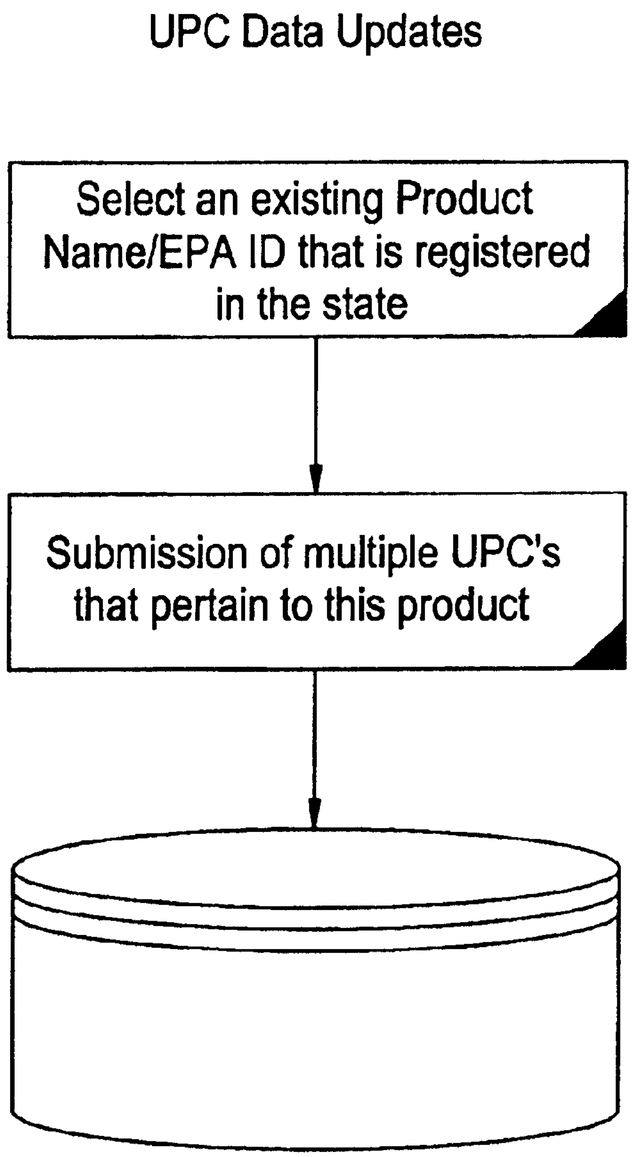
FIG. 15 is a flowchart showing how UPC data may be updated in a state product database.

As shown in FIG. 15, a state agent may select an existing product which is registered in the state and submit multiple UPCS that correspond to that product to be entered into appropriate databases as shown in FIG. 14.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

What is claimed is:

1. A method of renewing a registration of an agricultural product, comprising:

transmitting a product renewal log-in form from a main agricultural product registration computer to a user computer;

receiving at the main agricultural product registration computer from the user computer a universal username and a universal password for a user;

accessing a multi-state database to retrieve a plurality of state usernames and corresponding state passwords for a corresponding plurality of states;

receiving at the main agricultural product registration computer an indication of a state among the plurality of states for which the agricultural product is to be renewed;

receiving at the main agricultural product registration computer an indication of the agricultural product for which the registration is to be renewed; and electronically communicating a product renewal application for the agricultural product to the selected state.

2. The method of claim 1, wherein the main agricultural product registration computer transmits the product renewal log-in form to the user computer via the Internet.

3. The method of claim 1, wherein electronically communicating the product renewal application to the selected state comprises communicating the product renewal application electronically from the main agricultural product registration computer to a state renewal computer system associated with the selected state.

4. The method of claim 1, wherein electronically communicating the product renewal application to the selected state further comprises using the state username and state password for the selected state to log-in to the state renewal computer system associated with the selected state.

5. The method of claim 1, wherein the universal username is used to access the multi-state database to retrieve the plurality of state usernames and corresponding state passwords for the corresponding plurality of states.

6. The method of claim 1, further comprising:

generating for the selected state a list of registered agricultural products corresponding to the received universal username; and communicating the list of registered agricultural products from the main agricultural product registration computer to the user computer.

7. The method of claim 6, further comprising:

receiving at the Web server from the user computer a list of selected registered agricultural products among the registered agricultural products; and electronically communicating product renewal applications for each selected registered agricultural product to the selected state.

8. The method of claim 1, further comprising:

receiving at the main agricultural product registration computer an indication of a second state among the plurality of states for which the agricultural product is to be renewed; and electronically communicating a second product renewal application for the agricultural product to the second selected state.

9. A method of renewing a registration of an agricultural product, comprising:

transmitting a one-stop product renewal log-in form from a Web server to a user computer;

receiving at the Web server from the user computer a universal username and a universal password and at least one selected state where registration of the agricultural product is to be renewed;

accessing a multi-state database to retrieve a username and password for each selected state; and electronically communicating a product renewal application to each selected state.

10. The method of claim 9, wherein electronically communicating a product renewal application to each selected state further comprises using the state username and state password for each selected state to log-in to a corresponding state renewal computer system.

11. The method of 9, wherein electronically communicating a product renewal application to each selected state comprises communicating the product renewal application electronically to a state renewal computer system associated with each selected state.

12. The method of claim 9, wherein the universal username and universal password, and the list of selected states where registration of the agricultural product is to be renewed, are received by the Web server via the Internet.

13. The method of claim 9, wherein the universal username is used to access the multi-state database to retrieve the username and password for each selected state.

14. The method of claim 9, further comprising:

generating a list of registered products corresponding to the received universal username; and communicating the list of registered products from the Web server to the user computer.

15. The method of claim 14, further comprising:

receiving at the Web server from the user computer a list of selected products among the registered products; and electronically communicating product renewal applications for each selected product to each selected state.

16. A method of renewing registration of an agriculture product, comprising:

transmitting a product renewal log-in form from a main agricultural product registration computer to a user computer;

receiving at the main agricultural product registration computer from the user computer a username and a password for a user;

receiving at the main agricultural product registration computer an indication of a state among a plurality of states for which the agricultural product is to be renewed; and electronically communicating a product renewal application for the agricultural product to the state.

17. The method of claim 16, wherein the main agricultural product registration computer accesses a multi-state database to retrieve a plurality of state usernames and corresponding state passwords for a corresponding plurality of states; and wherein electronically communicating the product renewal application to the state further comprises using a state username and a state password for the state to log-in to the state renewal computer system associated with the state.

18. The method of claims 17, wherein the username is used to access the multi-state database to retrieve the plurality of state usernames and corresponding state passwords for the corresponding plurality of states.

19. The method of claim 17, further comprising:

generating for a selected state a list of registered agricultural products corresponding to the received username; and communicating the list of registered agricultural products from the main agricultural product registration computer to the user computer.

20. The method of claim 17, further comprising:

receiving a Web server from the user computer a list of selected registered agricultural products among the registered agricultural products; and electronically communicating product renewal applications for each selected registered agricultural product to the state.

21. The method of claim 16, wherein the main agricultural computer product registration computer transmits the product renewal log-in form to the user computer via the Internet.

22. The method of claim 16, wherein electronically communicating the product renewal application to a state comprises communicating the product renewal application electronically from the main agricultural product registration computer to a state renewal computer system associated with a state.

23. The method of claim 16, further comprising:

receiving at the main agricultural product registration computer an indication of a second state among the plurality of states for which the agricultural product is to be renewed; and electronically communicating a second product renewal application for the agricultural product to the second state.

24. A method for registration of an agricultural product, comprising:

transmitting a product log-in form to a user computer;

receiving from the user computer a username and a password and at least one selected state where the agricultural product is to be renewed, registered, or cancelled; and electronically communicating a product application to each selected state.

25. The method of claim 24, wherein the main agricultural computer product registration computer electronically communicates the product application to the selected state via the Internet.

26. A method for canceling registration of an agriculture product, comprising:

transmitting a product log-in form from a main agricultural product registration computer to a user computer;

receiving at the main agricultural product registration computer from the user computer a username and a password for a user;

receiving at the main agricultural product registration computer an indication of a state among a plurality of states for which the agricultural product is to be canceled; and electronically communicating a product cancellation application for the agricultural product to the state.

27. The method of claim 26, wherein the main agricultural computer product registration computer transmits the product log-in form to the user computer via the Internet.

28. A method for registration of an agriculture product, comprising:

transmitting a product log-in form from a main agricultural product registration computer to a user computer;

receiving at the main agricultural product registration computer from the user computer a username and a password for a user;

receiving at the main agricultural product registration computer an indication of a state among a plurality of states for which the agricultural product is to be registered; and electronically communicating a product registration application for the agricultural product to the state.

29. The method of claim 28, wherein the main agricultural computer product registration computer transmits the product log-in form to the user computer via the Internet.

30. A method for registration of an agriculture product, comprising:

transmitting a form from a main agricultural product registration computer to a user computer;

receiving at the main agricultural product registration computer from the user computer a username and a password for a user;

receiving at the main agricultural product registration computer an indication of a state among a plurality of states for which the agricultural product is to be processed; and sending a product registration application for the agricultural product to the state;

wherein the agriculture product registration computer receives a request for at least one of registering, canceling, and renewing.

31. The method of claim 30, wherein the main agricultural computer product registration computer transmits a form from a main agricultural product registration computer to a user computer via the Internet.

* * * * *